(12) United States Patent
Steele, Jr.

(10) Patent No.: US 6,205,460 B1
(45) Date of Patent: Mar. 20, 2001

(54) SYSTEM AND METHOD FOR FLOATING-COMPUTATION FOR NUMBERS IN DELIMITED FLOATING POINT REPRESENTATION

(75) Inventor: Guy L. Steele, Jr., Lexington, MA (US)

(73) Assignee: Sun Microsystems, Inc., Palo Alto (CA)

( * ) Notice: Subject to any disclaimer, the term of this patent is extended or adjusted under 35 U.S.C. 154(b) by 0 days.

(21) Appl. No.: 09/576,312

(22) Filed: May 22, 2000

Related U.S. Application Data

(62) Division of application No. 09/016,708, filed on Jan. 30, 1998.

(51) Int. Cl.$^7$ .................................................. G06F 7/38
(52) U.S. Cl. ........................................ 708/495; 340/146.2
(58) Field of Search ............................. 708/495–514; 340/146.2

(56) References Cited

U.S. PATENT DOCUMENTS

| | | | |
|---|---|---|---|
| 5,357,237 | * 10/1994 | Bearden et al. | ................. 340/146.2 |
| 6,018,756 | * 1/2000 | Wolrich et al. | ................. 340/146.2 |

* cited by examiner

*Primary Examiner*—Tan V. Mai
(74) *Attorney, Agent, or Firm*—Richard A. Jordon

(57) ABSTRACT

Floating point numbers and other values are represented in a "delimited" representation in which all numbers, including those which would in the IEEE Std. 754 representation, be in the de-normalized format, are in a format which is normalized with an implicit most significant digit having the value "one." For numbers which would, in the IEEE Std. 754 representation, be in the de-normalized format, in the delimited representation.

(i) all of the bits of the exponent field have the value "zero,"

(ii) the bits in the fraction field correspond to the bits in the fraction field of the de-normalized format shifted to the left a number of times corresponding to one more than the leading zeros in the fraction field of the de-normalized format thereby to provide the implicit most significant digit with the value "one," and (iii) a delimiter flag is provided in the bit position of the fraction field to the right of the bit which corresponds to the least significant bit in the fraction field of the de-normalized format, thereby to indicate the series of bits in the fraction field of the delimited representation which correspond to the series of bits immediately to the right of the most significant bit of the fraction field of the de-normalized format. Arrangements are described for converting numbers and other values between the IEEE Std. 754 representation and the delimited representation, between the delimited representation and a common expanded representation in which arithmetic operation are performed, and for directly comparing numbers and other values in the delimited representation.

6 Claims, 6 Drawing Sheets

US 6,205,460 B1

SYSTEM AND METHOD FOR FLOATING-COMPUTATION FOR NUMBERS IN DELIMITED FLOATING POINT REPRESENTATION

This is a division of Ser. No. 09/016,708 Jan. 30, 1998.

FIELD OF THE INVENTION

The invention generally relates to systems and methods for performing floating point computation, and more particularly to systems and methods for performing floating point computations which conform to behavior specified in IEEE Standard ("Std.") 754. The invention provides a normalized representation for common representational format for numbers and other values for which diverse formats are specified in IEEE Std. 754.

BACKGROUND OF THE INVENTION

Digital electronic devices, such as digital computers, calculators, and other devices, perform arithmetic calculations on values in integer, or "fixed point," format, in fractional, or "floating point" format, or both. IEEE Standard 754, (hereinafter "IEEE Std. 754" or "the Standard")) published in 1985 by the Institute of Electrical and Electronic Engineers, and adopted by the American National Standards Institute (ANSI), defines several standard formats for expressing values in floating point format, and a number of aspects regarding behavior of computation in connection therewith. In accordance with IEEE Std. 754, a value $(-1)^s 2^e f$ in a representation in floating point format comprises a plurality of binary digits, or "bits," having the structure $$se_{msb} \ldots e_{lsb} f_{msb} \ldots f_{lsb}$$

where bit "s" is a sign bit indicating whether the entire value is positive or negative, bits "$e_{msb} \ldots e_{lsb}$" comprise an exponent field represent the exponent "e" in unsigned binary biased format, and bits "$f_{msb} \ldots f_{lsb}$" comprise a fraction field that represents the fractional portion "f" in unsigned binary format ("msb" represents "most significant bit" and "lsb" represents "least significant bit"). The Standard defines two general formats, namely, a "single" format which comprises thirty-two bits, and a "double" format which comprises sixty-four bits. In the single format, there is one sign bit "s," eight bits "$e_7 \ldots e_0$" comprising the exponent field and twenty-three bits "$f_{22} \ldots f_0$" comprising the fraction field. In the double format, there is one sign bit "s," eleven bits "$e_{10} \ldots e_0$" comprising the exponent field and fifty-two bits "$f_{51} \ldots f_0$" comprising the fraction field.

As indicated above, the exponent field of the floating point representation "$e_{msb} \ldots e_{lsb}$" represents the exponent "E" in biased format. The biased format provides a mechanism by which the sign of the exponent is implicitly indicated. In particular, the bits "$e_{msb} \ldots e_{lsb}$" represent a binary encoded value "e" such that "e=E+bias." This allows the exponent E to extend from−126 to+127, in the eight-bit "single" format, and from−1022 to+1023 in the eleven-bit "double" format, and provides for relatively easy manipulation of the exponents in multiplication and division operations, in which the exponents are added and subtracted, respectively.

IEEE Std. 754 provides for several different formats with both the single and double formats which are generally based on the bit patterns of the bits "$e_{msb} \ldots e_{lsb}$" comprising the exponent field and the bits $f_{msb} \ldots f_{lsb}$ comprising the fraction field. If a number is represented all of the bits "$e_{msb} \ldots e_{lsb}$" of the exponent field are binary one's (that is, if the bits represent a binary-encoded value of "255" in the single format or "2047" in the double format) and all of the bits $f_{msb} \ldots f_{lsb}$ of the fraction field are binary zeros, then the value of the number is positive or negative infinity, depending on the value of the sign bit "s;" in particular, the value "v" is $v=(-1)^s \infty$, where "$\infty$" represents the value "infinity." On the other hand, if all of the bits "$e_{msb} \ldots e_{lsb}$" of the exponent field are binary one's and if the bits $f_{msb} \ldots f_{lsb}$ of the fraction field are not all zero's, then the value that is represented is deemed "not a number," abbreviated in the Standard by "NaN."

If a number has an exponent field in which the bits "$e_{msb} \ldots e_{lsb}$" are neither all binary ones nor all binary zeros (that is, if the bits represent a binary-encoded value between 1 and 254 in the single format or between 1 and 2046 in the double format), the number is said to be in a "normalized" format. For a number in the normalized format, the value represented by the number is $v=(-1)^s 2^{e-bias}(1.|f_{msb} \ldots f_{lsb})$, where "|" represents a concatenation operation. Effectively, in the normalized format, there is an implicit most significant digit having the value "one," so that the twenty-three digits in the fraction field of the single format, or the fifty-two digits in the fraction field of the double format, will effectively represent a fraction having twenty-four digits or fifty-three digits of precision, respectively.

Finally, if a number has an exponent field in which the bits "$e_{msb} \ldots e_{lsb}$" are all binary zeros, representing the binary-encoded value of "zero," the number is said to be in a "de-normalized" format. For a number in the de-normalized format, the value represented by the number is $v=(-1)^s 2^{l-bias}(0.|f_{msb} \ldots f_{lsb})$. It will be appreciated that the range of values of numbers that can be expressed in the de-normalized format is disjoint from the range of values of numbers that can be expressed in the normalized format, for both the single and double formats.

A problem arises in connection with numbers in the de-normalized format. In particular, numbers in the de-normalized format are difficult to process and to produce.

SUMMARY OF THE INVENTION

The invention provides a new and improved system and method for performing floating point computations on numbers using a new representation that provides a common representational format for numbers which would, in accordance with the IEEE Std. 754, be in normalized format as well as numbers which would, in accordance with the IEEE Std. 754, be in de-normalized format. The invention further provides an arrangement for converting numbers between the new representation and the respective normalized or de-normalized format, as appropriate, and for comparing numbers and other values in the new representation.

In brief summary, floating point numbers and other values (illustratively, "NaN," or "not a number" values) are represented in a new "delimited" representation in which all numbers, including those which would in the IEEE Std. 754 representation, be in the de-normalized format, are in a format which is normalized with an implicit most significant digit having the value "one." For numbers which would, in the IEEE Std. 754 representation, be in the de-normalized format, in the delimited representation (i) all of the bits of the exponent field have the value "zero,"

(ii) the bits in the fraction field correspond to the bits in the fraction field of the de-normalized format shifted to the left, that is, to more significant bit positions, a number of times corresponding to one more than the leading zeros in the fraction field of the de-normalized format thereby to provide the implicit most significant digit with the value "one," and (iii) a delimiter flag is provided in the bit position of the fraction field of the delimited representation immediately to the right, that is, in the next less significant bit position, of the bit which corresponds to the least significant bit in the fraction field of the de-normalized format, thereby to indicate the series of bits in the fraction field of the delimited representation which correspond to the series of bits immediately to the right of the most significant bit of the fraction field of the de-normalized format, Embodiments of the invention provide arrangements for converting numbers and other values in the various formats IEEE Std. 754 representation to the delimited representation and for converting numbers and other values in the delimited representation to the appropriate format of the IEEE Std. 754 representation. In addition, embodiments of the invention provide arrangements for converting numbers and other values in the delimited representation to a common expanded representation for performing arithmetic operations, and for converting numbers and other values in the expanded representation to the delimited representation. Further, embodiments of the invention provide an arrangement for comparing numbers and other values in the delimited representation, without the necessity of converting them to either the IEEE Std. 754 representation or the expanded representation.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
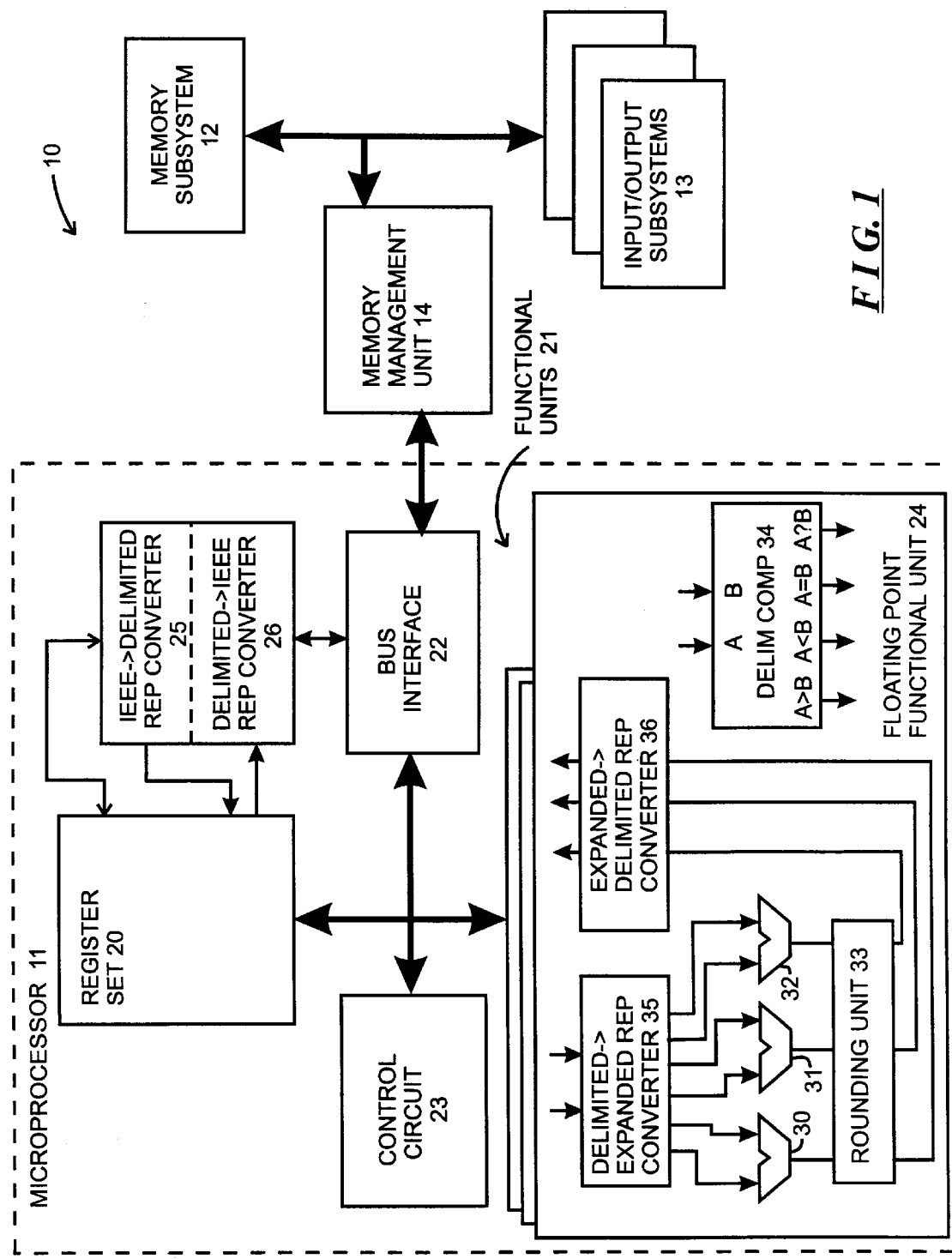
FIG. 1 is a functional block diagram of a digital computer including a functional unit for performing floating point computations using new delimited and expanded representational formats, constructed in accordance with the invention.

FIG. 1 depicts a functional block diagram of a digital computer 10 including a functional unit for performing floating point computations using a common representation format for all numbers and other values that can be accommodated using the various formats of the representations defined in IEEE Std. 754. With reference to FIG. 1, the digital computer system 10 includes a microprocessor 11 which communicates with a memory subsystem 12 and one or more input/output subsystems generally identified by reference numeral 13 through a memory management unit 14. The memory subsystem 12 includes a number of physical addressable storage locations in which data and instructions (which will be referred to collectively herein as "information") to be processed by the microprocessor 11 may be stored. In addition, the microprocessor 11, after processing data, may transfer the processed data to the memory subsystem 12 for storage.

The digital computer system 10 may include a number of diverse types of input/output subsystems 13, including mass storage subsystems, operator input and output subsystems, network ports and the like. The mass storage subsystems generally provide long-term storage for information which may be processed by the microprocessor 11. The mass storage subsystems may include such devices as disk or tape subsystems, optical disk storage devices and CD-ROM devices in which information may be stored and/or from which information may be retrieved. One or more of the mass storage subsystems may utilize removable storage media which may be removed and installed by an operator, which may allow the operator to load programs and data into the digital computer system 10 and obtain processed data therefrom. Under control of control information provided thereto by the microprocessor 11, information stored in the mass storage subsystems may be transferred to the memory subsystem 12 for storage. After the information is stored in the memory subsystem 12, the microprocessor 11 may retrieve it from the memory subsystem 12 for processing. After the processed data is generated, the microprocessor 11 may also enable the mass storage subsystems to retrieve the processed data from the memory subsystem 12 for relatively long-term storage.

The operator input and output subsystems generally provide an operator interface to the digital computer system 10. In particular, the operator input subsystems may include, for example, keyboard and mouse devices, which an operator may use to interactively input information to the digital computer system 10 for processing. In addition, the operator input subsystems may provide mechanisms whereby the operator may control the digital computer system 10. The operator output subsystems may include devices such as video display devices, through which the digital computer system 10, under control of the microprocessor 11, displays results of processing to the operator. In addition, a printer may be provided to provide a hardcopy output for the operator.

The network ports may enable the digital computer system 10 to connect to a communication link, thereby connecting the computer system 10 in a computer network. The network ports enable the computer system 10 to transmit information (including both program instructions and data) to, and receive information from, other computer systems and other devices in the network (not shown). In a typical network organized according to, for example, the client-server paradigm, certain computer systems in the network are designated as servers, which store information for processing by the other, client computer systems, thereby to enable the client computer systems to conveniently share the information. A client computer system which needs access to information maintained by a particular server will enable the server to download the information to it over the network. After processing the data, the client computer system may also return the processed data to the server for storage. In addition to computer systems (including the above-described servers and clients), a network may also include, for example, printers and facsimile devices, digital audio or video storage and distribution devices, and the like, which may be shared among the various computer systems connected in the network. The communication links interconnecting the computer systems in the network may, as is conventional, comprise any convenient information-carrying medium, including wires, optical fibers or other media for carrying signals among the computer systems. Computer systems transfer information over the network by means of messages transferred over the communication links, with each message including information and an identifier identifying the device to receive the message.

As is conventional, each of the input/output subsystems 13 will typically include registers and other data storage elements (not shown) which store control, status and other information which are used to control the operations performed by the respective input/output subsystem 13 and to indicate its operational status. The microprocessor 11 may store information in the registers and other data storage elements, thereby to control the respective input/output subsystem 13, in a manner similar to the manner in which it stores information in the memory subsystem 12. Similarly, the microprocessor 11 may retrieve the information contained in the input/output subsystem 13, in a manner similar to the manner in which it retrieves information in the memory subsystem 12, to ascertain the operational status of the respective input/output subsystem 13.

The memory management unit 14 performs a number of operations. In particular, the memory management unit 14 typically includes a memory cache, which caches information requested by the microprocessor 11 from the memory subsystem 12. In addition, as is typical, when the microprocessor 11 requests information to be retrieved from, for example, the memory subsystem 12, or provides processed data for storage in, for example, the memory subsystem 12, the microprocessor 11 will provide an address in a virtual address space to the memory management unit 14. The various application programs processed by the microprocessor 11 may be provided with respective virtual address spaces. The virtual address space is divided into "pages," each of which comprises a selected number of virtual addressable storage locations, with each virtual addressable storage location storing information. The pages of an application program's virtual address space are normally stored on a mass storage subsystem, and the microprocessor 11 enables individual ones of the pages to be copied to the memory subsystem 12 as they are needed during processing, and for those pages that are modified during processing the microprocessor 11 may enable them to be copied to the mass storage subsystem for long-term storage.

Respective pages of a virtual address space may be compactly stored in physical locations in the memory subsystem 12, which are identified by physical addresses, and in performing an access operation in connection with a particular virtual address space location (that is, a retrieval of information from or a storage of information in a particular physical location) in response to a request from the microprocessor 11, the memory management unit 14 will perform a translation of the virtual address to obtain the physical address for use in performing the access operation in connection with the memory subsystem 12. In addition, the memory management unit 14 may perform several checking operations, including checking to determine whether or not the page is in the memory subsystem 12, whether or not the application program has permission to access (that is, read data from or write data into) the page, and whether or not the requested page is a valid page in the virtual address space, and the like. If the memory management unit 14 makes a negative determination in the checking operation, that is, if it determines, for example, that the page is not in the memory subsystem 12, that the application program does not have the appropriate access permission, or if it determines that the requested page of the virtual address space page is not a valid page in the application program's virtual address space, it may generate an ACCESS FAULT indication, which the microprocessor 11 may receive and use in performing selected fault handling operations.

The microprocessor 11 generally includes a number of elements, including a register set 20, one or more functional units generally identified by reference numeral 21, a bus interface 22 and a control circuit 23. The control circuit 23 controls the processing operations as performed by the microprocessor 11 under control of instructions provided by a program. Generally, under control of the control circuit 23, the bus interface 22, cooperating with the memory management unit 14, retrieves instructions and data from the memory subsystem 12 or data storage elements maintained by particular input/output subsystems 13 for processing and loads the retrieved data into registers in the register set 20. Also under control of the control circuit 23, the functional units 21 perform logical, integer and floating point arithmetic, and other processing operations in connection with data which the control circuit 23 enables to be transferred thereto from the register set 20, to generate processed data which will be transferred to the register set 20 for storage. The control circuit 23 may also enable the bus interface 22, also cooperating with the memory management unit 14, to transfer processed data from the register set 20 to the memory subsystem 12 or data storage elements maintained by particular input/output subsystems 13 for storage.

As noted above, the invention provides an arrangement for performing floating point computation using delimited and expanded floating point representations for numbers and other values that would be represented in all of the formats defined by IEEE Std. 754. In the delimited representation, the number of bits that are used to represent a number is the same as in the IEEE Std. 754. On the other hand, in the expanded floating point representation, the number of bits used in the representation is generally two bits larger than the number of bits that are used to represent a number in the IEEE Std. 754. That is, if a number is represented in the thirty-two bit "single" format defined in the IEEE Std. 754, in the expanded representation described herein the number would be represented by thirty-four bits. In addition, if a number is represented in the sixty-four bit "double" format defined in the IEEE Std. 754, in the expanded representation described herein, the number would be represented by sixty-six bits. In the following, the arrangement will be described in connection with the sixty-four bit "double" format and the sixty-six bit common representation, and extensions to the thirty-two bit "single" format and thirty-four bit expanded representation will be apparent to those skilled in the art.

In accordance with the invention, the microprocessor 11 is provided with a functional unit 25 for performing floating point computations on numbers and other values, each defined by sixty-four bit words and converters 25 and 26 for converting numbers from the sixty-four bit IEEE Std. 754 representation to the sixty-four bit delimited representation, and from the sixty-four bit delimited representation to the sixty-four bit IEEE Std. 754 representation, respectively. The structure and operation of the converters 25 and 26 will be described below in connection with FIGS. 2 and 3, respectively. The IEEE Std. 754 to delimited representation converter 25 receives numbers and other values in the IEEE Std. 754 representation from the bus interface 22 or the scalar register set 34, converts them to the delimited representation and provides them to the register set 20 for storage. In addition, the delimited to IEEE Std. 754 representation converter 26 receives numbers and other values in the delimited representation, converts them to the IEEE Std. 754 representation and provides them to the register set 20 or to the bus interface 22 for storage.

The floating point functional unit 25 comprises several elements, including, for example, an adder 30, a multiplier 31, a divider 32 and a rounding unit 33, which generally perform arithmetic operations, a delimited comparator unit 34, which performs comparison operations in connection with numbers and other values in the delimited, representation, and a delimited to expanded representation converter 30 and an expanded to delimited representation converter 31. The delimited to expanded representation converter 30 receives numbers and other values in the delimited representation from the register set 20 and, under control of the control circuit 23, converts them to the expanded representation for processing by the adder 30, multiplier 31 or divider 32. A functional block diagram of the delimited to expanded representation converter 30 will be described below in connection with FIG. 4. The expanded representation is a sixty-six bit common representation for all numbers and other values in the double format of the IEEE Std. 754, and corresponds to the common representation described in U.S. patent application Ser. No. 08/987,724, filed Dec. 9, 1997, in the name of Guy L. Steele Jr., and entitled "System And Method For Floating-Point Computation" (hereinafter referred to as "the Steele application"), assigned to the assignee of the present application and incorporated herein by reference.

Adder 30, multiplier 31 and divider 32 are structured and operate in a manner generally similar to corresponding elements which may be provided in a floating point functional unit for use in connection with the IEEE Std. 754 representation, except that they (that is, elements 30, 31 and 32) will include circuitry to accommodate processing of different number of bits than would be used in connection with the IEEE Std. 754 representation. The rounding unit 33 performs arithmetical rounding of the results generated by the elements 30, 31 and 32 to accommodate various rounding modes defined by the IEEE Std. 754. The structure and operation of the rounding unit 33 to accommodate processing of numbers and other values in the expanded representation in connection with one of the rounding modes is described in the aforementioned Steele application, and will not be described herein.

The numbers and other values generated by the rounding unit 33, which are in the sixty-six bit expanded representation, are coupled to the delimited to expanded representation converter 36. The delimited to expanded representation converter 36, in turn, under control of the control circuit 23, converts the numbers and other values in the sixty-six bit expanded representation to the sixty-four bit delimited representation for storage in the register set 20.

As noted above, the delimited comparator 34 performs comparison operations in connection with numbers and other values in the delimited representation. In performing the comparison operations, the delimited comparator 34 does not require conversion from the delimited representation to either the IEEE Std. 754 representation or the expanded representation. Under control of the control circuit 23, the delimited converter 34 receives the numbers and other values in the delimited representation that are to be compared at inputs A and B, and generates in response thereto appropriate A>B (A greater than B), A<B (A less than B), A=B (A equal to B) and A?B (indeterminate) signals which can be used by, for example, the control circuit 23 in its later operations.

Before proceeding further, it would be helpful to describe the structure of both the delimited representation and the expanded representation and their relationships with each other and with the IEEE Std. 754 representation. In the following, the sixty-four bit "double" format of the IEEE Std. 754 representation and the associated sixty-four bit delimited representation and sixty-six bit expanded representation will be described; for the thirty-two bit "single" format of the IEEE Std. 754, the associated thirty-two bit delimited representation and thirty-four bit expanded representation will be apparent to those skilled in the art. As noted above, the double format of the IEEE Std 754 representation comprises $$s e_{10} \ldots e_0 f_{51} \ldots f_0$$

where "s" is a one-bit sign field, "$e_{10} \ldots e_0$" is an eleven bit exponent field and "$f_{51} \ldots f_0$" is a fifty-two bit fraction field. Using the double format, the following can be represented:

(i) numbers having a values of positive and negative zero, in which all of the bits of both the exponent field and the fraction field have the value zero, the value of the sign bit "s" determining whether the number has a value positive zero or negative zero;

(ii) numbers having the value of positive or negative infinity, in which all of the bits of the exponent field have the value "one" and the bits of the fraction field have the value zero; for a number having the value of positive infinity, the bit of the sign field is "zero," and for a number having the value of negative infinity, the bit of the sign field is "one;"

(iii) numbers which have values other than positive or negative zero or positive or negative infinity in a "normalized" format, in which the bits of the exponent field are not all zero or one; in the normalized format, the most significant bit of the fraction portion of the number, which always has the value "one," is implicit and is not provided in the representation;

(iv) numbers which have values other than positive or negative zero or positive or negative infinity in a "de-normalized" format, in which all of the bits of the exponent field are zero; and (v) "not a number" ("NaN") values, in which all of the bits of the exponent field have the value one, but at least one of the bits of the fraction field has a value other than zero.

A value in the delimited representation is of the form $$s \, de_{10} \ldots de_0 \, df_{51} \ldots df_0$$

where "s" is a one-bit sign field, "$de_{10} \ldots de_0$" is an eleven bit exponent field and "$df_{51} \ldots df_0$" is a fifty-two bit fraction field. All of the values in the double format of the IEEE Std. 754 representation as described above are represented in the same manner in the delimited representation except for those in the denormalized format. For a number in the IEEE Std. 754 representation which has a value in the de-normalized format, (a) the bits $de_{10} \ldots de_0$ comprising the exponent field will all have the value "zero," and (b) the bits comprising the fraction field of the delimited representation will correspond to the bits comprising the fraction portion of the IEEE Std. 754 representation, shifted to the left by k+1 bits, where "k" corresponds to the number of leading zeros in the fraction field of the IEEE Std. 754 representation, with a delimiting flag having the value "one" in bit position $df_k$. The left shift will provide that the most significant bit $df_{51}$ of the fraction field of the delimited representation contains the value corresponding to the first bit after the most significant bit $f_{51-k}$ of the fraction field of the IEEE St. 754 representation that contains the value "one," thereby to provide that the most significant bit of the fraction portion of the number which has the value "one" is, as in the normalized format of the IEEE Std. 754 representation, implicit and not provided in the delimited representation. Thus, the fraction fields of all of the numbers other than positive and negative zero and positive and negative infinity, are, in the delimited representation, represented so as to provide that the most significant bit of the fraction portions of the respective numbers which have the value "one" will be implicit.

The delimiter flag operates to identify the next bit $df_{k+1}$ as containing the least significant bit $f_0$ of the fraction field of the IEEE Std. 754 representation. This serves to indicate that bits $df_{51} \ldots df_{k+1}$ of the fraction field of the delimited representation contain the bits $f_{51-k} \ldots f_0$ of the fraction field of the denormalized representation. It will be appreciated that "k" may be any value between zero and fifty-one, inclusive.

Conversely, from the above, it will be appreciated that, to convert a number or other value from the delimited representation to the IEEE Std. 754 representation:

(i) if the bits of the exponent field of the delimited representation are not all zeros, indicating that the number or other value to be converted has a value which would, in the IEEE Std. 754 representation, be represented in the normalized format, or is either positive or negative infinity, or is a "not a number" value, no change is made to the delimited representation, and (ii) if the bits of both the exponent field and the fraction field of the delimited representation are all zeros, indicating that the number has the value positive or negative zero, no change is made to the delimited representation, but (iii) if the bits of the exponent field of the delimited representation are all zeros, but not all of the bits of the fraction field are zeros, the number would be represented, in the IEEE Std. 754 representation in the denormalized format. In that case, the delimited representation would be converted to the IEEE Std. 754 representation such that (a) the bits of the IEEE Std. 754 representation comprising the sign and exponent fields will correspond to the same bits as in the delimited representation, and (b) the bits of the IEEE Std. 754 representation comprising the fraction field will correspond to the bits of the fraction field of the delimited representation, to which a high-order "one" bit has been concatenated, shifted to the right by K'+1 bit positions, where "k'" corresponds to the number of bit positions $df_{k'-1} \ldots df_0$ of the fraction field of the delimited representation between the delimiting flag in bit position $df_{k'+1}$ and the least significant bit position $df_0$.

It will be appreciated that the concatenation of the high-order "one" bit prior to the shift will provide the implicit high-order "one" bit which is required in the denormalized format of the IEEE Std. 754 representation. Furthermore, the shift by k'+1 bit positions will ensure that the delimiting flag is shifted out of the IEEE Std. 754 representation.

A value in the expanded representation is of the form $$S\ E_{11} \ldots E_0\ F_{52} \ldots F_0$$

where "S" is a one-bit sign field, "$E_{11} \ldots E_0$" is a twelve bit exponent field and "$F_{52} \ldots F_0$" is a fifty-three bit fraction field. A value in the expanded representation is formed form a number or a NaN value in double format of the IEEE Std. 754 representation such that the sign bit "S" of the sign field of the expanded representation corresponds to the sign bit "s" of the sign field of the IEEE Std. 754 representation, and the exponent and fraction fields of the expanded representation are derived from the corresponding fields of the IEEE Std. 754 representation as follows. Generally, for the exponent portion of the values in the expanded representation, the value of the exponent is biased about $2^{11}$ (that is, 100000000000 in binary form), which will allow the exponent of any number or other value in the IEEE Std. 754 representation to be expressed.

More specifically, (i) for a number in the IEEE Std. 754 representation which has the value positive or negative zero, (a) the bits of the expanded representation comprising the fraction portion will all have the value "zero," and (b) the bits comprising of the expanded representation the exponent will comprise the value $2^{11}$-52, which corresponds to "011111001100" in binary form;

(ii) for a number in the IEEE Std. 754 representation which has the value positive or negative infinity, (a) the most significant bit $F_{52}$ of the fraction field of the expanded representation will have the value "one" and the other bits $F_{51} \ldots F_0$ will all have the value "zero," and (b) the bits comprising the exponent portion will all have the value "one" (that is, "111111111111"), which corresponds to the bias value "100000000000" plus "11111111111," the value of the exponent field in the IEEE Std. 754 representation;

(iii) for a number in the IEEE Std. 754 representation which has a value in the normalized format, (a) the bits comprising the fraction portion will correspond to the bits comprising the fraction portion of the IEEE Std. 754 representation, with the implicit most significant bit of the IEEE Std. 754 representation being explicitly represented in the expanded representation; that is, bits $F_{52} \ldots F_0$ of the expanded representation correspond to "$1|f_{51} \ldots f_0$," where "$f_{51} \ldots f_0$" correspond to the bits of the fraction field of the IEEE Std. 754 representation and "|" represents the concatenation operation; and (b) the bits comprising the exponent portion will comprise the value $2^{11}$+e, where "e" represents the binary-encoded value of the exponent field of the IEEE Std. 754 representation; that is, bits $E_{11} \ldots E_0$ of the expanded representation correspond to "$1|e_{10} \ldots e_0$," where "$e_{10} \ldots e_0$" correspond to the bits of the exponent field of IEEE Std. 754 representation and "|" represents the concatenation operation;

(iv) for a number in the IEEE Std. 754 representation which has a value in the de-normalized format,
  (a) the bits comprising the fraction field of the expanded representation will correspond to the bits comprising the fraction portion of the IEEE Std. 754 representation, shifted to the left until the most significant bit $F_{52}$ contains the value "one," the effect is to multiply the value in the fraction field of the IEEE Std. 754 representation by $2^k$, where "k" corresponds to the number of bit positions $e_{51} \ldots e_{51-k}$ between the most significant bit position "$e_{51}$" of the fraction field and the most significant bit position "$e_{51-k}$" of the fraction field which contains a bit having the value "one;" in addition, the bit $F_0$ will be provided with the value "zero;"
  (b) the bits comprising the exponent field of the expanded representation will correspond to "$2^{11}$-k," that is, "100000000000" minus "k;"
effectively, for each shift of the value in the fraction field to the left, the value of the number is effectively multiplied by two, and to compensate the value of the exponent is reduced by one thereby to effectively divide the value of the number by two; the result provides a value in the expanded representation in a normalized format which corresponds to the value in the IEEE Std. 754 representation in de-normalized format; and
(v) for a value in the IEEE Std. 754 representation which is "NaN" (not a number),
  (a) the most significant bit $F_{52}$ of the fraction field of the expanded representation will have the value "one" and the other bits $F_{51} \ldots F_0$ will all have the values corresponding to bits $f_{51} \ldots f_0$ of the IEEE Std. 754 representation, and
  (b) the bits comprising the exponent portion will all have the value "one" (that is, "111111111111"), which corresponds to the bias value "1000000000000" plus "11111111111111," the value of the exponent field in the IEEE Std. 754 representation.

Conversely, from its (i) through (v) above, it will be appreciated that:

(vi) if a number or other value in the expanded representation has an exponent having a high-order bit $E_{11}$ which has the value zero, then it may either have the value positive or negative zero or certain values in the de-normalized format, in which case:
  (a) the bits $e_{10} \ldots e_0$ comprising the exponent field of the IEEE Std. 754 representation will all have the value "zero," and
  (b) the bits $f_{51} \ldots f_0$ comprising the fraction field of the IEEE Std. 754 representation will correspond to the bits $F_{52} \ldots F_1$ of the fraction field of the expanded representation shifted to the right by K bits, where "K" corresponds to $2^{11}$ minus the binary-encoded value represented by bits $E_{10} \ldots E_0$ of the exponent field;
(vii) if a number or other value in the expanded representation has an exponent having a high-order bit $E_{11}$ which has a value other than zero, and other bits $E_{10} \ldots E_0$ all of which have the value zero, it will be appreciated that the number or other value will correspond to number in the de-normalized format of the IEEE Std. 754 representation for which the high-order bit f(51) of the fraction field has the value "one," in which case:
  (a) the bits $e_{10} \ldots e_0$ comprising the exponent field of the IEEE Std. 754 representation will all have the value "zero," and
  (b) the bits $f_{51} \ldots f_0$ comprising the fraction field of the IEEE Std. 754 representation will correspond to the bits $F_{52} \ldots F_1$ of the fraction field of the expanded representation; and
(viii) if a number or other value in the expanded representation has an exponent having a high-order bit $E_{11}$ which has a value other than zero, at at least one of bits $E_{10} \ldots E_0$ has a value other than zero, then it may either have a value corresponding to positive or negative infinity, a number in the normalized format, or a NaN (not a number) value, in which case:
  (a) the bits $e_{10} \ldots e_0$ comprising the exponent field of the IEEE Std. 754 representation will , have the values of the bits $E_{10} \ldots E_0$ of the expanded representation, respectively, and
  (b) the bits $f_{51} \ldots f_0$ comprising the fraction field of the IEEE Std. 754 representation will correspond to the bits $F_{51} \ldots F_0$ of the expanded representation, that is, with bit $F_{52}$ of the expanded representation discarded.

Thus, it will be appreciated from the above that, a conversion from the delimited representation to the expanded representation is performed in the same manner as described above in connection with conversations from the IEEE Std. 754 representation to the expanded representation, unless the number whose representation to be converted would, in the IEEE Std. 754 representation, be in the denormalized format. In that case,
  (a) the bits comprising the fraction field of the expanded representation will correspond to the bits comprising the fraction portion of the IEEE Std. 754 representation, with (I) the implicit most significant bit of the IEEE Std. 754 representation being explicitly represented in the expanded representation, and (II) the delimiter flag being cleared; and
  (b) the bits comprising the exponent field of the expanded representation will correspond to "$2^{11}$-k," that is, "100000000000" minus "K," where "k" corresponds to the number of trailing zero's in the fraction field of the delimited representation.

Similarly, a conversion from the expanded representation to the delimited representation is performed in the same manner as described above in connection with conversions from the expanded representation of the IEEE Std. 754 representation, unless the number to be converted would, in the IEEE Std. 754 representation would, be in the denormalized format. In that case:
  (a) the bits $de_{10} \ldots de_0$ comprising the exponent field of the delimited representation will all have the value "zero," and
  (b) the bits $df_{51} \ldots df_0$ comprising the fraction field of the delimited representation will correspond to the bits $F_{52} \ldots F_0$ comprising the fraction field of the expanded representation, shifted to the left by one bit position, and further with one of the bits $df_{delim\_flag}$ being set as a delimiter flag. The bit $df_{delim\_flag}$ that is set is a function of the difference between the bias value for the exponent field for the expanded field for the expanded representation, $2^{11}$, and the binary-encoded value of the exponent field of the number in the expanded representation being converted.

Figure 2:
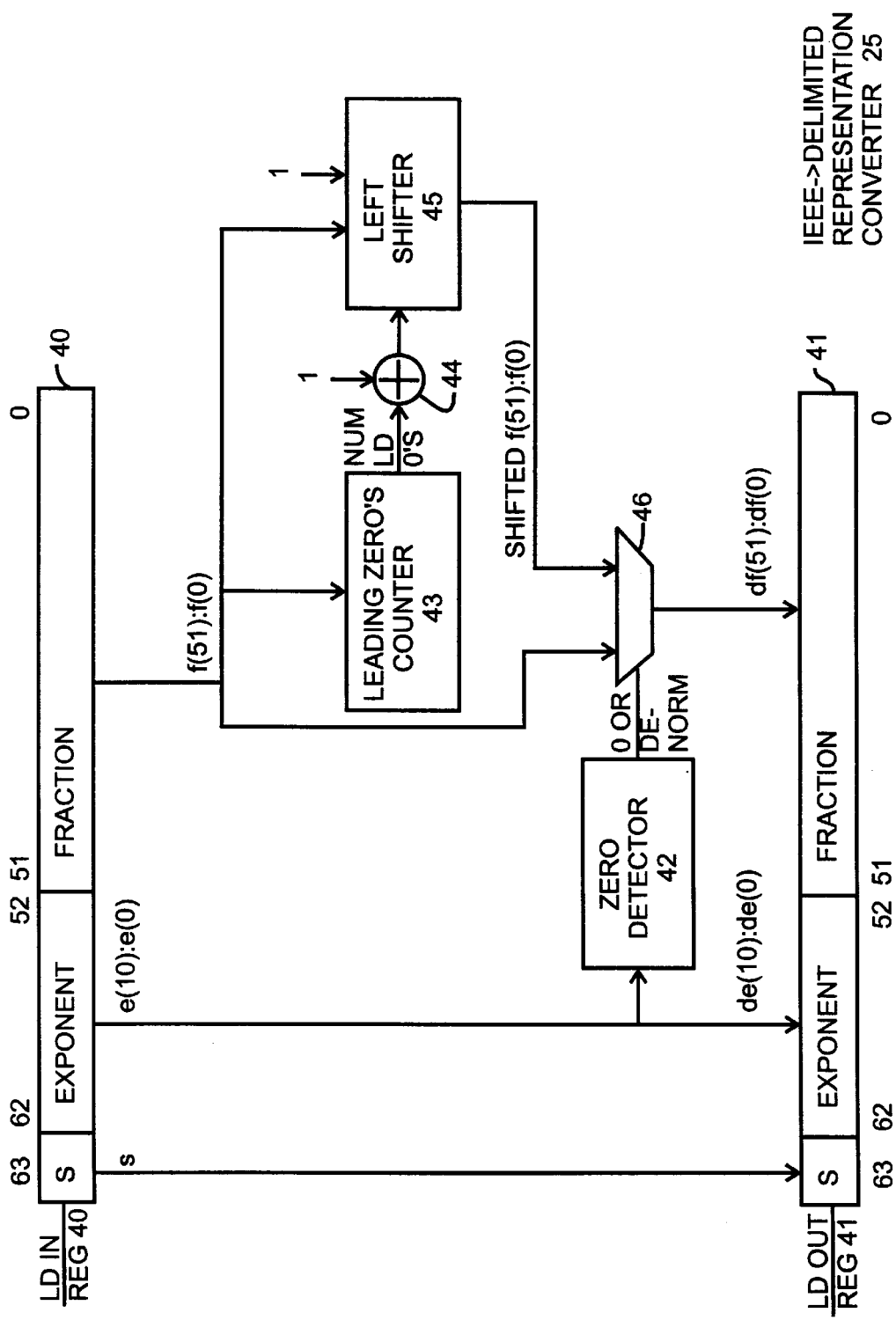
FIG. 2 is a functional block diagram of a circuit for converting numbers and other values in formats of IEEE Std. 754 to the delimited representational format.
Figure 3:
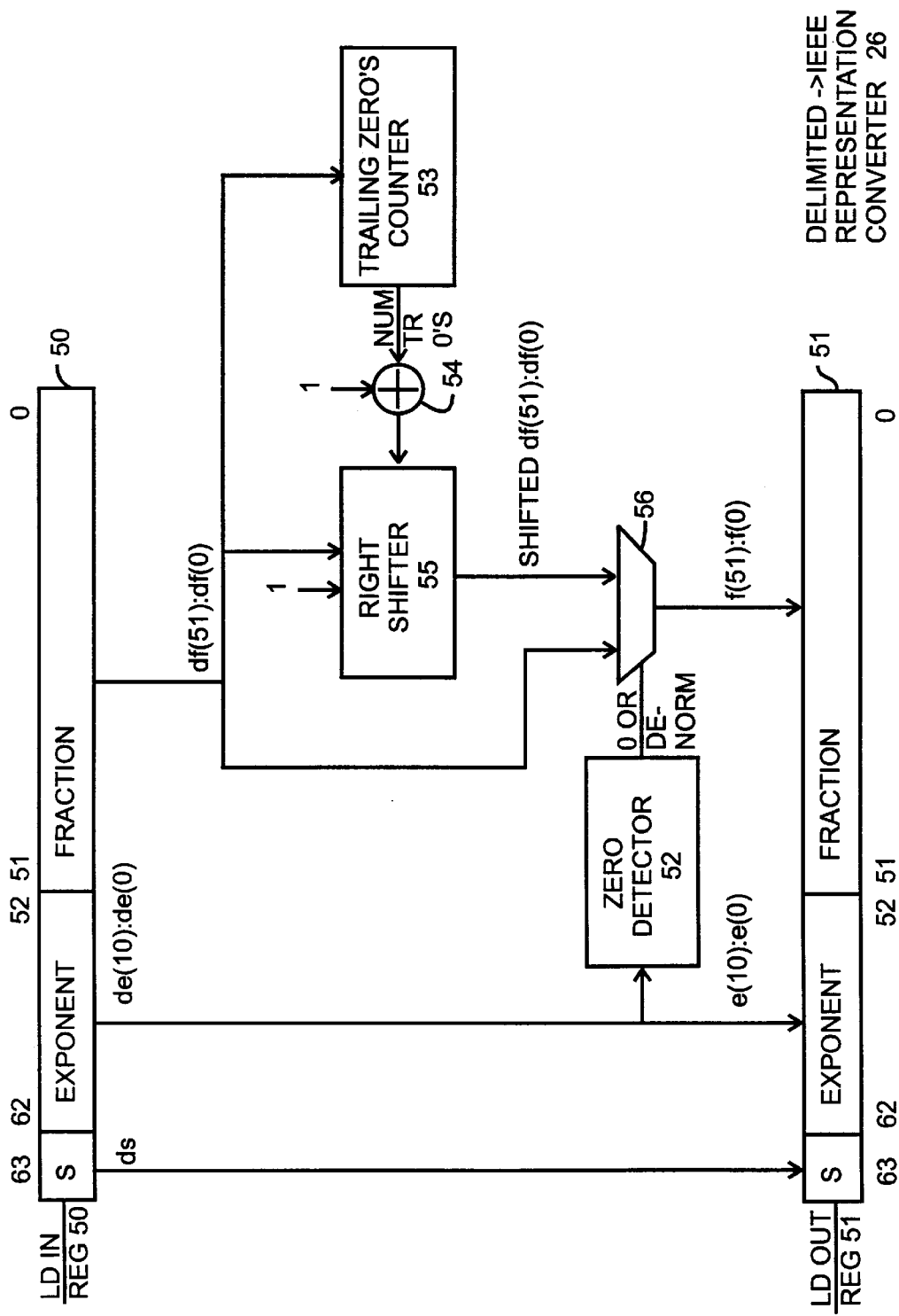
FIG. 3 is a functional block diagram of a circuit for converting numbers and other values in the delimited representational format to the appropriate respective format of the IEEE Std. 754.
Figure 4:
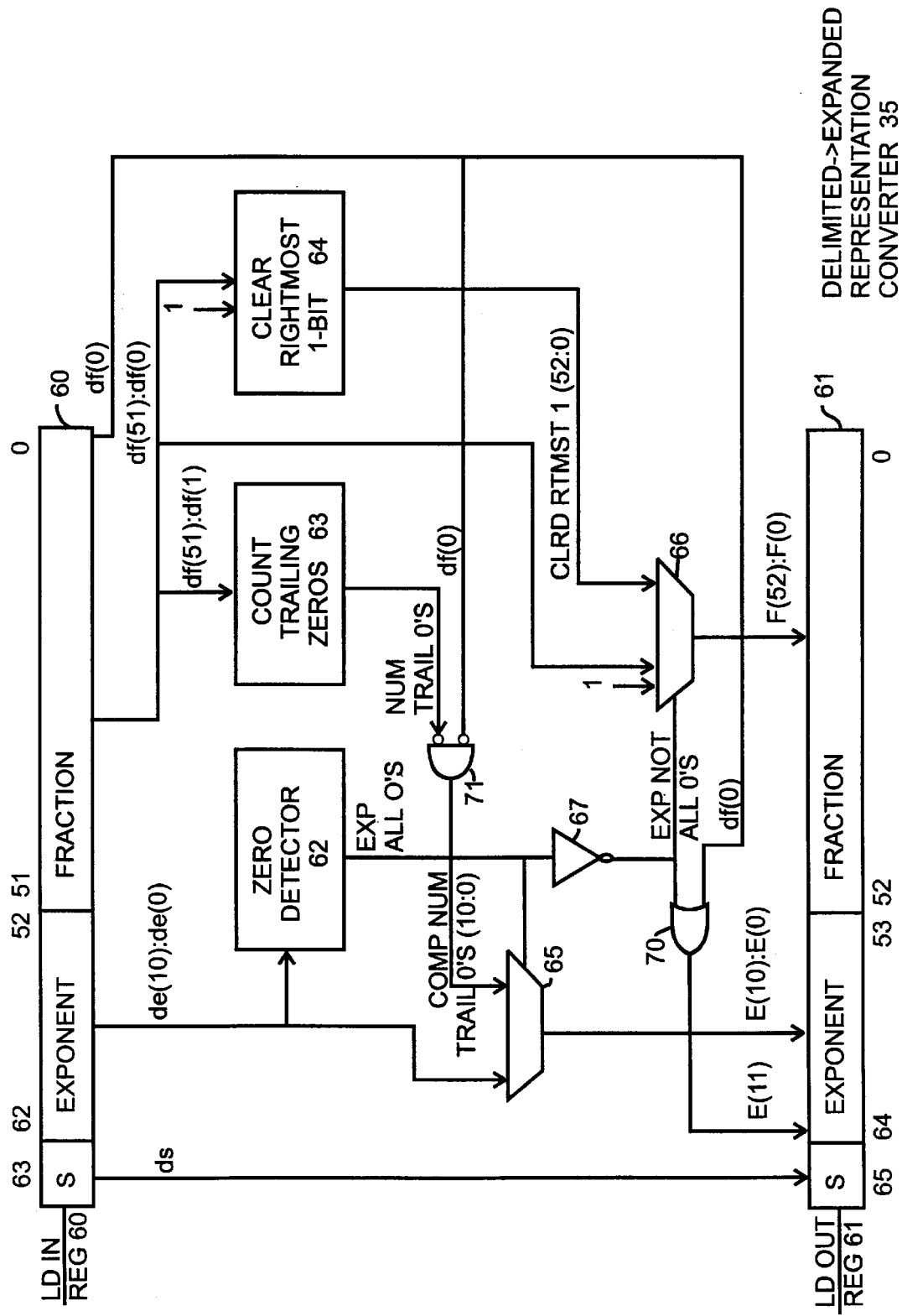
FIG. 4 is a functional block diagram of a circuit for converting numbers and other values in the delimited representational format to the expanded representational format for use in arithmetic operations.
Figure 5:
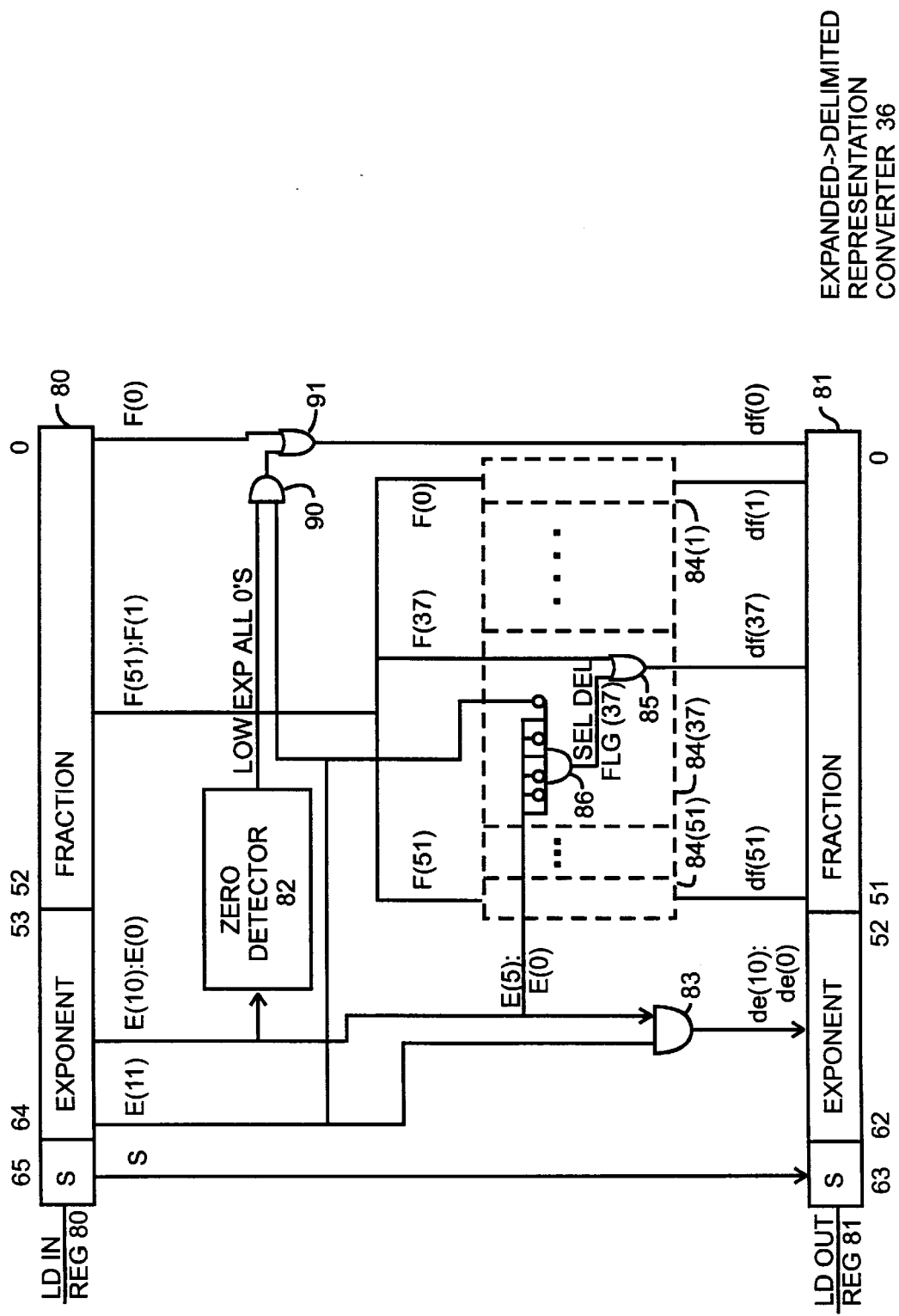
FIG. 5 is a functional block diagram of a circuit for converting numbers and other values in the expanded representational format to the delimited representational format.

FIGS. 2 and 3 depict functional block diagrams of the converters 25 and 26 for converting numbers in the sixty-four bit IEEE Std. 754 "double" representation to the sixty-four bit delimited representation, and for converting numbers in the sixty-four bit delimited representation to the sixty-four bit IEEE Std. 754 "double" representation, respectively. FIGS. 4 and 5 depict functional block diagrams of the converters 35 and 36 for converting numbers in the sixty-four bit delimited representation to the sixty-six bit expanded representation, and for converting numbers in the sixty-six bit expanded representation to the sixty-four bit delimited representation, respectively.

With reference initially to FIG. 2, IEEE Std. 754 to delimited representation converter 25 includes a sixty-four bit input register 40, a sixty-four bit output register 41, a zero detector 42, a leading zero's counter 43, an adder 44, a left shifter 45, and a multiplexer 46. The input register 40 receives a number or other value in the sixty-four bit IEEE Std. 754 representation, and components 42 through 46 generate bit values for the sixty-four bit delimited representation which are loaded into the output register 41. The input register 40 operates to store the number or other value in the sixty-four bit IEEE Std. 754 representation in response to a LD_IN_REG_40 load input register 40 signal from the control circuit 23, and the output register 41 operates to store the sixty-four bit delimited representation in response to a LD_OUT_REG_41 load output register 41 signal also from the control circuit 23. The control circuit 23 may also provide control signals for controlling the other components of the converter 25 as necessary. It will be appreciated that the input register 40 may comprise a register in register set 20 or the but interface 22, and the output register 41 may comprise a register in the register set 20.

As noted above, numbers and other values in both the IEEE Std. 754 representation and the delimited representation comprise a sign field, an exponent field and a fraction field. For input register 40, which stores the number or other value in the IEEE Std. 754 representation, high-order bit (63) of input register 40 stores the bit comprising the sign field, intermediate bits (62) through (52) of input register 40 store bits $e_{10} \ldots e_0$ comprising the exponent field and low-order bits (51) through (0) of input register 40 store bits $f_{51} \ldots f_0$ comprising the fraction field. For output register 41, which stores the number or other value in the delimited representation, high-order bit (63) of output register 41 stores the bit comprising the sign field, intermediate bits (62) through (52) of output register 41 store bits $de_{10} \ldots de_0$ comprising the exponent field and low-order bits (51) through (0) of output register 41 store bits $df_{51} \ldots df_0$ comprising the fraction field.

As noted above, the sign bit of the number or other value in the delimited representation corresponds to the sign bit of the number or other value in the IEEE Std. 754 representation. Accordingly, the high order bit (63) of the input register 40 provides an "s" sign signal that is provided to high order bit (63) of the output register 41 without modification. When the LD_OUT_REG_41 load output register 41 signal is asserted, the "s" signal from the input register 40 will be store din the high order bit (63) of the output register 41 to provide the sign field of the delimited representation. It will be appreciated that the value stored in the high order bit (63) of output register 41 will correspond to the value stored in the high order bit (63) of the input register 40.

The bits (62) through (52) of the input register 40, which store the exponent field of number or other value in the IEEE Std. 754 representation, provide e(10):e(0) exponent signals in parallel to the output register 41. As noted above, the exponent field of the number or other value in the delimited representation corresponds to the exponent field of the number or other value in the IEEE Std. 754 representation. Accordingly, the bits (62) through (52) of the input register 40 provide respective e(10):e(0) exponent signals that are provided to respective bits (62) through (52) of the output register 41 without modification. When the LD_OUT_REG_41 load output register 41 signal is asserted, the e(10):e(0) signals from the input register 40 will be stored in the bits (62) through (52) of the output register 41 to provide the exponent field of the delimited representation. It will be appreciated that the values stored in the bits (62) through (52) of output register 41 will correspond to the values stored in the bit (62) through (52) of the input register 40.

The e(10):e(0) exponent signals provided by input register 40 are also coupled to the zero detector 42. The asserted or negated condition of each of the e(i) exponent signals (index "i" being an integer from zero to ten) reflects the value of the correspondingly-indexed bit $e_i$ of the exponent field that is stored in bits (62) through (52) of the input register 40. The zero detector 42 determines whether all of the e(10):e(0) exponent signals are negated, which will be the case if all of the bits $e_{10} \ldots e_0$ of the exponent field in bits (62) through (52) of input register 40 have the value zero, and asserts or negates a 0_OR_DE-NORM zero or de-normalized signal based on that determination. If the zero detector 42 determines that not all of the e(10):e(0) exponent signals are negated, it will negate the 0_OR_DE-NORM zero or de-normalized signal. If not all of the e(10):e(0) exponent signals are asserted, then at least one of the $e_{10} \ldots e_0$ bits of the exponent field will have a value other than zero, and so the number or other value stored in the input register 40 will be either positive or negative infinity, a number in the normalized format, or a NaN (not a number) value. On the other hand, if the zero detector 42 determines that all of the e(10):e(0) exponent signals are negated, then all of the bits $e_{10} \ldots e_0$ of the exponent field stored in bits (62) through (52) of the input register 40 will have the value zero. In that case, the number or other value stored in the input register 40 will have either the value positive or negative zero or comprise a number in de-normalized format.

The 0_OR_DE-NORM zero or de-normalized signal provided by zero detector 42 controls multiplexer 46. The multiplexer 46 receives, at one input, f(51):f(0) fraction signals which reflect the condition of the bits $f_{51} \ldots f_0$ of the fraction field of the number or other value stored in input register 40. That is, the f(i) fraction signal (index "i" being an integer from zero to fifty-one) reflects the value of the correspondingly-indexed bit $f_i$ of the fraction field. If the zero detector determines that not all of the e(10):e(0) exponent signals are negated, which will be the case of not all of the bits $e_{10} \ldots e_0$ of the exponent field of the number or other value in the IEEE Std. 754 representation have the value "zero," the negated 0_OR_DE-NORM zero or denormalized signal enables multiplexer 46 to couple the f(51):f(0) fraction signals from the input register 40 as df(51):df(0) denormalized fraction signals to the output register 41. When the LD_OUT_REG_41 load output register 41 signal is asserted, the df(51):df(0) signals form the input register 40 will be stored in the bits (51) through (0) of the output register 41 to provide the fraction field of the delimited representation. It will be appreciated that the values stored in the bits (51) through (0) of output register 41 will correspond to the value stored in the bits (51) through (0) of the input register 40.

The f(51):f(0) signals from the input register 40 are also provided to the leading zero's counter 43 and the left shifter 45. The leading zero's counter 43 receives the f(51):f(0) fraction signals representative of the $f_{51} \ldots f_0$ fraction bits of the fraction field stored in bits (51) through (0) of the input register 40 and generates the NUM_LD_0's number of leading zero's signal to identify a value "k," in binary-encoded form, corresponding to the number "k" of consecutive bits $F_{51} \ldots f_{51-k}$ of the fraction field having the value zero, to the first bit $f_{(51-k)-1}$ of the fraction field which has the value "one." If all of the f(51):f(0) fraction signals are negated, which will be the case if all of the fraction bits $F_{51} \ldots f_0$ stored in input register 40 have the value zero, then the leading zero's counter 43 will generate a NUM_LD_0's number of leading zero's signal representing the value "fifty-two;" it will be appreciated that this will occur if the number stored in the input register 40 corresponds to either positive or negative zero. The NUM_LD_0's number of leading zero's signal generated by leading zero's counter 43 is provided to the adder 44, which also receives a "1" signal representing the value 1. The adder 44 generates an output signal representing the binary encoded value corresponding to the NUM_LD_0's number of leading zero's signal, incremented by the value "one," which is provided to the left shifter 45.

The left shifter 45 also receives the f(51):f(0) fraction signals from the input register 40 and a low-order "1" signal, and generates SHIFTED_f(51):f(0) shifted fraction signals, which correspond to the f(51):f(0) and low-order "1" signals shifted to the left by a number of bit positions corresponding to the value represented by the signal provided by adder 44. The low-order "1" signal provides the delimiter flag for the delimited representation and, since the f(51):f(0) fraction signals are shifted by one bit position more than the number of leading zero's, the amount of shift will ensure that the SHIFTED_f(51) shifted fraction signal will correspond to the f((51−k)−1) fraction signal, which, in turn, corresponds to the first bit $f_{(51-k)-1}$ of the fraction field of the IEEE Std. 754 representation after the most significant bit $f_{51-k}$ that the value "one."

The SHIFTED_f(51):f(0) shifted fraction signals provided by the left shifter 45 are coupled to the second input of the multiplexer 46. If the 0_OR_DE-NORM zero or denormalized signal from the zero detector 42 is asserted then the multiplexer 46 will coupled the SHIFTED_f(51):f(0) shifted fraction signal as the df(51):df(0) signals to the output register 41. It will be appreciated that the zero detector 42 will assert the 0_OR_DE-NORM zero or denormalized signal if the e(10):e(0) exponent signals are all negated, which, in turn, will be the case if the input register 40 contains a number which has the value zero or a value in the denormalized format. of the IEEE Std. 754 representation. When the LD_OUT_REG_41 load output register 41 signal is asserted, the df(51):df(0) signals from the input register 40 will be stored in the bits (51) through (0) of the output register 41 to provide the fraction field of the delimited representation. It will be appreciated that the values stored in the bits (51) through (0) of the input register 40, shifted to the left by a number of the bit positions corresponding to one more than the number of leading zero's of the IEEE Std. 754 representation, and to which a delimiter flag has been added in the bit position to the right of the bit $df_{k+1}$ corresponding to the low-order bit $f_0$ of the fraction field of the IEEE Std. 754 representation.

A functional block diagram of the delimited to IEEE Std. 754 representation converter 26 is depicted in FIG. 3. With reference to FIG. 3, converter 26 includes a sixty-four bit input register 50, a sixty-four bit output register 51, a zero detector 52, a trailing zero's counter 53, an adder 54, a right shifter 55, and a multiplexer 56. The input register 50 receives a number or other value in the sixty-four bit delimited representation, and components 52 through 56 generate bit values for the sixty-four bit IEEE Std. 754 representation which are loaded into the output register 51. The input register 50 operates to store the number or other value in the sixty-four bit delimited representation in response to a LD_IN_REG_50 load input register 50 signal from the control circuit 23, and the output register 51 operates to store the sixty-four bit IEEE Std. 754 representation in response to a LD_OUT_REG_51 load output register 51 signal also from the control circuit 23. The control circuit 23 may also provide control signals for controlling the other components of the converter 25 as necessary. It will be appreciated that the input register 50 may comprise a register in register set 20 or the bus interface 22, and the output register 51 may comprise a register in the register set 20.

As noted above, numbers and other values in both the delimited representation and the IEEE Std. 754 representation comprise a sing field, an exponent field and a fraction field. For input register 50, which stores the number or other value in the delimited representation, high-order bit (63) of input register 50 stores the bit comprising the sign field, intermediate bits (62) through (52) of input register 50 store bits $de_{10} \ldots de_0$ comprising the exponent field and low-order bits (51) through (0) of input register 50 store bits $df_{51} \ldots df_0$ comprising the fraction field. For output register 51, which stores the number or other value in the IEEE Std. 754 representation, high-order bit (63) of output register 51 stores the bit comprising the sign field, intermediate bits (62) through (52) of output register 51 store bits $e_{10} \ldots e_0$ comprising the exponent field and low-order bits (51) through (0) of output register 51 store bits $f_{51} \ldots f_0$ comprising the fraction field.

As noted above, the sing bit of the number or other value in the IEEE Std. 754 representation corresponds to the sign bit of the number or other value in the delimited representation. Accordingly, the high order bit (63) of the input register 50 provides a "ds" sign signal that is provided to high order bit (63) of the output register 51 without modification. When the LD_OUT_REG_51 load output register 51 signal is asserted, the "ds" signal from the input register 50 will be stored in the high order bit (63) of the output register 51 to provide the sign field of the expanded representation. It will be appreciated that the value stored in the high order bit (63) of output register 51 will correspond to the value stored in the high order bit (63) of the input register 50.

The bits (62) through (52) of the input register 50, which store the exponent field of number or other value in the delimited representation, provide de(10):de(0) exponent signals in parallel to the output register 51. As noted above, the exponent field of the number or other value in the IEEE Std. 754 representation corresponds to the exponent field of the number or other value in the delimited representation. Accordingly, the bits (62) through (52) of the input register 50 provide respective de(10):de(0) exponent signals that are provided to respective bits (62) through (52) of the output register 51 without modification. When the LD_OUT_REG_51 load output register 51 signal is asserted, the de(10):de(0) signals from the input register 50 will be stored in the bits (62) through (52) of the output register 51 to provide the exponent field of the delimited representation. It will be appreciated that the value stored in the bits (62) through (52) of output register 51 will correspond to the values stored in the bits (62) through (52) of the input register 50.

The de(10):de(0) exponent signals provided by input register 50 are also coupled to the zero detector 52. The asserted or negated condition of each of the de(i) exponent signals (index "i" being an integer from zero to ten) reflects the value of the correspondingly-indexed bit $de_i$ of the exponent field that is stored in bits (62) through (52) of the input register 50. The zero detector 52 determines whether all of the de(10):de(0) exponent signals are negated, which will be the case if all of the bits $de_{10} \ldots de_0$ of the exponent field in bits (62) through (52) of input register 50 have the value zero, and asserts or negates a 0_OR_DE-NORM zero or de-normalized signal based on that determination. If the zero detector 52 determines that not all of the de(10):de(0) exponent signals are negated, it will negate the 0_OR_DE-NORM zero or de-normalized signal. If not all of the de(10):de(0) exponent signals are asserted, then at leas tone of the $de_{10} \ldots de_0$ bits of the exponent field will have a value other than zero, and so the number or other value stored in the input register 50 will be either positive or negative infinity, a number which would, in the IEEE Std. 754 representation, be in the normalized format, or number which would, in the IEEE Std. 754 representation, be a NaN (not a number) value. On the other hand, if the zero detector 52 determines that all of the de(10):de(0) exponent signals are negated, then all of the bits $de_{10} \ldots de_0$ of the exponent field stored in bits (62) through (52) of the input register 50 will have the value zero. In that case, the number or other value stored in the input register 50 will have either the value positive or negative zero or comprise a number which would, in the IEEE Std. 754 representation, be in de-normalized format.

The 0_OR_DE-NORM zero or de-normalized signal provided by zero detector 52 controls multiplexer 56. The multiplexer 56 receives, at one input, df(51):df(0) fraction signals which reflect the condition of the bits $df_{51} \ldots df_0$ of the fraction field of the number or other value stored in input register 50. That is, the df(i) fraction signal (index "i" being an integer from zero to fifty-one) reflects the value of the correspondingly-indexed bit $df_i$ of the fraction field. If the zero detector determines that not all of the e(10):e(0) exponent signals are negated, which will be the case of not all of the bits $de_{10} \ldots de_0$ of the exponent field of the number or other value in the delimited representation have the value "zero," the negated 0_OR_DE-NORM zero or denormalized signal enables multiplexer 56 to couple the df(51):df(0) fraction signals from the input register 50 as f(51):f(0) fraction signals to the output register 51. When the LD_OUT_REG_51 load output register 51 signal is asserted, the f(51):f(0) signals from the input register 50 will be stored in the bits (51) through (0) of the output register 51 to provide the fraction field of the IEEE Std. 754 representation. It will be appreciated that the values stored in the bits (51) through (0) of output register 51 will correspond to the values stored in the bits (51) through (0) of the input register 50.

The f(51):f(0) signals from the input register 50 are also provided to the trailing zero's counter 53 and the left shifter 55. The trailing zero's counter 53 receives the f(51):f(0) fraction signals representative of the $f_{51} \ldots f_0$ fraction bits of the fraction field stored in bits (51) through (0) of the input register 50 and generates the NUM_LD_0's number of trailing zero's signal to identify a value "k," in binary-encoded form, corresponding to the number "k" of consecutive bits $df_{k-1} \ldots df_0$ of the fraction field having the value zero, from the last, or rightmost, bit $df_k$ of the fraction field which has the value "one." It will be appreciated that the rightmost bit $df_k$ of the fraction field which has the value "one" will correspond to the delimiter flag in the delimited representation. If all of the df(51):df(0) fraction signals are negated, which will be the case if all of the fraction bits $df_{51} \ldots df_0$ stored in input register 50 have the value zero, then the trailing zero's counter 53 will generate a NUM_TR_0'S number of trailing zero's signal representing the value "fifty-two;" it will be appreciated that this will occur if the number stored in the input register 50 corresponds to either positive or negative zero. The NUM_TR_0'S number of trailing zero's signal generated by trailing zero's counter 53 is provided to the adder 54, which also receives a "1" signal representing the value 1. The adder 54 generates an output signal representing the binary encoded value corresponding to the NUM_TR_0'S number of trailing zero's signal, incremented by the value "one," which is provided to the right shifter 55.

The right shifter 55 also receives the df(51):df(0) fraction signals from the input register 50 and a high-order "1" signal, and generates SHIFTED_df(51):df(0) shifted fraction signals, which correspond to the df(51):df(0) and high-order "1" signals shifted to the right by a number of bit positions corresponds to the value represented by the signal provided by adder 54. The high-order "1" signal proves the implicit high-order "one" bit for the delimited representation. Since the f(51):f(0) fraction signals are shifted by one bit position more than the number of trailing zero's, the amount of shift will ensure that the SHIFTED_df(0) shifted fraction signal will correspond to the f(k) fraction signal, which, in turn, corresponds to the last bit $df_k$ of the fraction field of the delimited representation to the left of the delimiter flag.

The SHIFTED_df(51):df(0) shifted fraction signals provided by the right shifter 55 are coupled to the second input of the multiplexer 56. If the 0_OR_DE-NORM zero or denormalized signal from the zero detector 52 is asserted then the multiplexer 56 will couple the SHIFTED_df(51):df(0) shifted fraction signals as the f(51):f(0) signals to the output register 51. It will be appreciated that the zero detector 52 will assert the 0_OR_DE-NORM zero or denormalized signal if the de(10):de(0) exponent signals are all negated, which, in turn, will be the case if the input register 50 contains a number which would, in the IEEE Std. 754 representation, have the value zero or a value in the denormalized format. When the LD_OUT_REG_51 load output register 51 signal is asserted, the f(51:f(0) signals from the multiplexer 56 will be stored in the bits (51) through (0) of the output register 51 to provide the fraction field of the IEEE Std. 754 representation. It will be appreciated that the values stored in the bits (51) through (0) of output register 51 will correspond to the values stored in the bits (51) through (0) of the input register 50, shifted to the right by a number of bit position correspond to one more than the number of trailing zero's of the delimited representation, and to which the implicit high-order "one" bit has been added in the bit position to the right of the bit $df_{52-k}$ of the fraction field of the delimited representation.

FIG. 4 depicts a functional block diagram of a delimited to expanded representation converter 35 useful in converting numbers and other values in the sixty-four bit delimited representation to the sixty-six bit expanded representation. As described above, the expanded representation represents numbers and other values in a normalized format such that the exponent field represents the exponent portion biased around the value $2^{11}$ and the implicit high-order bit of the fraction portion having the value "one" is explicitly represented in the fraction field. The delimited flag used in the delimited representation is not depicted in the fraction field of the expanded representation.

With reference to FIG. 4, the delimited to expanded representation converter 35 includes an input register 60, an output register 61, a zero detector 62, a trailing zero's counter 63, a clear rightmost 1-bit circuit 64, multiplexers 65 and 66, an inverter 67, an OR gate 70 and a gated driver 71. The input register 60 operates to receive and load a sixty-four bit number or other value in the delimited representation that is to be converted to the expanded representation in response to the assertion of a LD_IN_REG_60 load input register 60 signal from the control circuit 23, and the output register 61 operates to receive and load the sixty-six bit expanded representation in response to the assertion of a LD_OUT_REG_61 load output register from the control circuit 23. The control circuit 23 may also provide control signals for controlling other components of the delimited to expanded representation converter 35 as necessary.

As noted above, numbers and other values in both the delimited representation and the expanded representation comprise a sign field, an exponent field and a fraction field. For input register 60, which stores the number or other value in the delimited representation, high-order bit (63) of input register 60 stores the number or other value in the delimited representation, high-order bit of input register 60 store bits $de_{10} \ldots de_0$ comprising the exponent field and low-order bits (51) through (0) of input register 60 store bits $df_{51} \ldots df_0$ comprising the fraction field. For output register 61, which stores the number or other value in the expanded representation, high-order bit (65) of output register 61 stores the bit comprising the sign field, intermediate bits (64) through (53) of output register 61 store bits $E_{11} \ldots E_0$ comprising the exponent field and low-order bits (52) through (0) of output register 61 store bits $F_{52} \ldots F_0$ comprising the fraction field.

As further noted above, the sign bit of the number or other value in the expanded representation corresponds to the sign bit of the number or other value in the delimited representation. Accordingly, the high order bit (63) of the input register 60 provides a "ds" sign signal that is provided to high order bit (65) of the output register 81 without modification. When the LD_OUT_REG_61 load output register 61 signal is asserted, the "ds" signal from the input register 60 will be stored in the high order bit (65) of the output register 61 to provide the sign field of the expanded representation. It will be appreciated that the value stored in the high order bit (65) of output register 61 will correspond to the value stored in the high order bit (63) of the input register 60.

The bits (62) through (52) of the input register 60, which store the exponent field of the number or other value in the delimited representation, provide de(10):de(0) exponent signals in parallel to the output register 61. As noted above, the exponent field of the number or other value in the expanded representation corresponds to (i) the exponent field of the number or other value in the delimited representation added to the value $2^{11}$, which corresponds to the binary value "100000000000" in the case of a number of other value that would, in the IEEE Std. 754 representation, be positive or negative infinity, a value that is "NaN" (not a number), or a number in the normalized format and (ii) the value $2^{11}$ minus a value "k," where "k" corresponds to the number of leading zero's in the IEEE Std. 754 representation, in the case of a number that is either positive or negative zero or a number or other value that would, in the IEEE Std. 754 representation, be in the denormalized format.

The zero detector 62 is provided to determine whether the number or other value in the input register 60 is (i) a number having the value positive or negative infinity, a value that would, in the IEEE Std. 754 representation be "NaN" (not a number), or a number that would, in the IEEE Std. 754 representation, be in the normalized format or (ii) a number that is either positive or negative zero or a number or other value that would, in the IEEE Std. 754 representation, be in the denormalized format. Thus, the de(10):de(0): exponent signals from the input register 60 are coupled to the zero detector 60. If the zero detector 60 determines that not all of the de(10):de(0) signals are zero, which will be the case if at least one of the bits $de_i$ of the exponent field is non-zero, the zero detector will negate an EXP_ALL_0'S exponent all zero's signal. It will be appreciated that this will occur if the number or other value stored in the input register 60 is in category (i) above, that is, if it is a number having the value positive or negative infinity, a value that would, in the IEEE Std. 754 representation be "NaN" (not a number), or a number that would, in the IEEE Std. 754 representation, be in the normalized format. On the other hand, if the zero detector 62 determines that all of the de(10):de(0) exponent signals are zero, which will be the case if all of the bits $de_i$ of the exponent field are zero, the zero detector 62 will assert the EXP_ALL_0'S exponent all zero's signal. It will be appreciated that this will occur if the number or other value stored in the input register 60 is in category (ii) above, that is, that it is a number that is either positive or negative zero or a number or other value that would, in the IEEE Std. 754 representation, be in the denormalized format.

If the number or other value stored in the input register 60 is in category (i) above, that is, if it is a number having the value positive or negative infinity, a value that would, in the IEEE Std. 754 representation be "NaN" (not a number), or a number that would, in the IEEE Std. 754 representation, be in the normalized format, the inverter 60 generates an asserted EXP_NOT_ALL_ZERO's exponent not all zero's signal, which energizes OR gate 70 to assert an E(11) signal to the bit (64) of the output register 61 to provide the high-order bit $E_{11}$ of the exponent field of the expanded representation. In addition, the negated EXP_ALL_ZERO'S exponent all zero's signal from zero detector 62 enables multiplexer 65 to couple the de(10):de(0) exponent signals from input register 60 as E(10):E(0) exponent signals to the bits (63) through (53) of the output register 61 to provide the bits $E_{10} \ldots E_0$ of the exponent field of the expanded representation.

Accordingly, the bits (62) through (52) of the input register 60 provide respective de(10):de(0) exponent signals that are provided to respective bits (62) through (52) of the output register 61 without modification. When the LD_OUT_REG_61 load output register 61 signal is asserted, the de(10):de(0) signals from the input register 60 will be stored in the bits (62) through (52) of the output register 61 to provide the exponent field of the delimited representation. It will be appreciated that the values stored in the bits (62) through (52) of output register 61 will correspond to the values stored in the bits (62) through (52) of the input register 60. When the LD_OUT_REG_61 load output register 61 signal is asserted, the E(11) signal from OR gate 70 and the E(10):E(0) signals from the multiplexer 65 will be stored in the bits (64) through (53) of the output register 61 to provide the respective bits $E_{11} \ldots E_0$ comprising the exponent field of the expanded representation.

On the other hand, if the number or other value stored in the input register 60 is in category (ii) above, that is, if it is a number that is either positive or negative zero or a number or other value that would, in the IEEE Std. 754 representation, be in the denormalized format, the de(10):de(0) exponent signals will all be negated. In the case, the zero detector 62 will assert the EXP_ALL_0'S exponent all zeros signal, in turn enabling the inverter 67 to generate a negated EXP_NOT_ALL_0'S exponent not all zero's signal. If the df(0) fraction signal is asserted, the OR gate 70 will be energized to assert the E(11) signal coupled to the bit (64) of the output register 61 to provide the high-order bit $E_{11}$ of the exponent field of the expanded representation. The df(0) fraction signal will be asserted if the bit $df_0$ of the fraction field is set. It will be appreciated that the bit $df_0$ will be set if that bit corresponds to the delimiter flag for the number or other value in the delimited representation stored in the input register 60, which will be provided for numbers which would, in the denormalized format of the IEEE Std. 754 representation, have a high-order bit $f_{51}$ of the fraction field which has the value "one." For such numbers, as will be appreciated from the description of converter 25 above (FIG. 3), the fraction field of the delimited representation corresponds to the fraction field of the IEEE Std. 754 representation shifted to the left by one bit position, thereby to provide the implicit high-order bit with the value "one," and the low-order bit $df_0$ of the fraction field of the delimited representation is provided with the value "one" to provide the set delimiter flag.

In addition, for such numbers (that is, numbers for which all of the de(10):de(0) exponent signals are negated and the df(0) fraction signal is asserted), it will be appreciated that the bits $E_{10} \ldots E_0$ of the exponent field of the expanded representation will all have the value zero. Accordingly, the asserted df(0) signal de-energizes the gated driver 71, enabling it to provide negated COMP_NUM_TRAIL_0'S (10:0) complemented number of trailing zero's signals, to one input of the multiplexer 65. The asserted EXP_ALL_0'S exponent all zero's enables the multiplexer 65 to couple the negated COMP_NUM_TRAIL_0'S (10:0) signals as the E(10):E(10) exponent signals to bits (63) to (53) of the output register 61. When the LD_OUT_REG_61 load output register 61 signal is asserted, the asserted E(11) signal from OR gate 70 and the negated E(10):E(0) signals from the multiplexer 65 will be stored in the bits (64) through (53) of the output register 61 to provide the respective bits $E_{11} \ldots E_0$ comprising the exponent field of the expanded representation.

On the other hand, if the number or value stored in the input register 60 is in category (ii) above, that is, if it is a number that is either positive or negative zero or a number or other value that would, in the IEEE Std. 754 representation, be in the denormalized format, but if the df(0) fraction signal from input register 60 is not asserted, then the OR gate 70 will provide a negated E(11) signal to bit (64) of the output register 61. In addition, the negated df(0) fraction signal will energize the gated driver 71, which enables it (that is, gated driver 71) to couple a NUM_TRAIL_0'S number of trailing zero's signal from the trailing zero's counter 63 as the COMP_NUM_TRAIL_0'S (10:0) complemented number of trailing zero's signal. The trailing zero's counter 63 receives df(51):df(1) fraction signals, representing the $df_{51} \ldots df_1$ fraction bits of the number or other value in the input register 60, and generates the NUM_TRAIL_0'S number of trailing zero's signal to identify the number of signals df(1) ... df(k) up to the first signal df(k+1) that is asserted. It will be appreciated that the first signal df(k+1) that is asserted will be associated with the bit df(k+1) that corresponds to the delimiter flag of the delimited representation. It will further be appreciated that the binary-encoded value represented by the NUM_TRAIL_0'S number of trailing zero's signal generated by the trailing zero's counter 63 corresponds to one less than the number of leading zero's in the fraction portion of the IEEE Std. 754 representation for the number in the input register 60. Since the df(0) signal is negated, the gated driver 71 couples the complement of the NUM_TRAIL_0'S number of trailing zero's signal as the COMP_NUM_TRAIL_0'S (10:0) complemented number of trailing zero's signal to the multiplexer 65. The negated EXP_ALL_0'S exponent all zero's signal from zero detector 62 enables the multiplexer to couple the COMP_NUM_TRAIL_0'S (10:0) complemented number of trailing zero's signal as the E(10):E(0) exponent signals to bits (63) through (53) of the output register 61. When the LD_OUT_REG_61 load output register 61 signal is asserted, the negated E(11) signal from OR gate 70 and the E(10):E(0) signals from the multiplexer 65 will be stored in the bits (64) through (53) of the output register 61 to provide the respective bits $E_{11} \ldots E_0$ comprising the exponent field of the expanded representation. The binary-encoded value represented by bits $E_{11} \ldots E_0$ corresponds to $2^{11}-k$, where $2^{11}$ corresponds to the bias value and "k" corresponds to the number of leading zeros of the number stored in the input register in the denormalized format of the IEEE Std. 754 representation.

The EXP_NOT_ALL_0'S exponent not all zero's signal generated by inverter 67 also controls the multiplexer 66. The multiplexer 66 provides F(52):F(0) fraction signals which are coupled to bits (52) through (0) of output register 61, thereby to provide the fraction field of the expanded representation. The multiplexer 66 receives, at one input, the df(51):df(0) fraction signals together with a high-order "1" signal. If the EXP_NOT_ALL_0'S exponent not all zero's signal is asserted, which will be the case if the number or other value stored in the input register 60 is in category (i) above, that is, if it is a number having the value positive or negative infinity, a value that would, in the IEEE Std. 754 representation be "NaN" (not a number), or a number that would, in the IEEE Std. 754 representation, be in the normalized format, the multiplexer 66 couples the high-order "1" signal and the df(51):df(0) fraction signals to the output register as the F(52) fraction signal (in the case of the high-order "1" signal) and F(51):F(0) fraction signals (in the case of the df(51):df(0) fraction signals, respectively) to the output register 61. When the LD_OUT_REG_61 load output register 61 signal is asserted, the F(52):F(0) signals from the multiplexer 66 will be stored in the bits (52) through (0) of the output register 61 to provide the respective bits $F_{52} \ldots F_0$ comprising the fraction field of the expanded representation. It will be appreciated that the high-order "1" signal explicitly provides the implicit high-order bit for both the delimited representation and the normalized format of the IEEE Std. 754 representation.

The multiplexer 66 also receives, at a second input, signals, identified as CLRD_RSMST_1 (52:0) cleared rightmost "one" signals from a clear right-most 1-bit circuit 64. The clear rightmost 1-bit circuit 64 receives the df(51):df(0) fraction signals together with a high-order "1" signal and generates the CLRD_RTMST_1 (52) signal to correspond to the high-order "1" signal, and the CLRD_RTMST_1 (51:0) signals to correspond to the df(51):df(0) fraction signals with the lowest-order, or rightmost, asserted signal being negated. The negation of the rightmost asserted signal will provide that, if the number or other value stored in the input register 60 is in category (ii) above, that is, if it is a number that is either positive or negative zero or a number or other value that would, in the IEEE Std. 754 representation, be in the denormalized format, the delimiter flag is cleared. In addition, the high-order "1" signal explicitly provides the implicit high-order bit for the delimited representation. If the number or other value in input register 60 is in category (ii) above, the EXP_NOT_ALL_0'S exponent not all zero's signal will be negated, which, in turn, enables multiplexer 66 to couple the CLRD_RTMST_1 (52:0) signals as the F(52):F(0) fraction signals to the output register 61. When the LD_OUT_REG_61 load output register 61 signal is asserted, the F(52):F(0) signals from the multiplexer 66 will be stored in the bits (52) through (0) of the output register 61 to provide the respective bits $F_{52} \ldots F_0$ comprising the fraction field of the expanded representation.

FIG. 5 depicts a functional block diagram of an expanded to delimited representation converter 36 useful in converting numbers and other values in the sixty-six bit expanded representation to the sixty-four bit delimited representation. With reference to FIG. 5, the expanded to delimited representation converter 36 includes an input register 80, an output register 81, a zero detector 82, a gated driver 83, a set of fraction bit value decoders 84(1) through 84(51) (generally identified by reference numeral 84(i)), an AND gate 90 and an OR gate 91. The input register 80 operates to receive and load a sixty-six bit number or other value in the expanded representation that is to be converted to the delimited representation in response to the assertion of a LD_IN_REG_80 load input register 80 signal from the control circuit 23, and the output register 81 operates to receive and load the sixty-four bit delimited representation in response to the assertion of a LD_OUT_REG_81 load output register from the control circuit 23. The control circuit 23 may also provide control signals for controlling other components of the expanded to delimited representation converter 36 as necessary.

As noted above, numbers and other values in both the expanded representation and the delimited representation comprise a sign field, an exponent field and a fraction field. For input register 80, which stores the number or other value in the expanded representation, high-order bit (65) of input register 80 stores the bit comprising the sign field, intermediate bits (64) through (53) of input register 80 store bits $E_{10} \ldots E_0$ comprising the exponent field and low-order bits (52) through (0) of input register 80 stores bits $F_{52} \ldots F_0$ comprising the fraction field. For output register 81, which stores the number or other value in the delimited representation, high-order bit (63) of output register 81 stores the bit comprising the sign field, intermediate bits (62) through (52) of output register 81 store bits $e_{10} \ldots e_0$ comprising the exponent field and low-order bits (51) through (0) of output register 81 stores bits $df_{51} \ldots df_0$ comprising the fraction field.

As further noted above, the sign bit of the number or other value in the delimited representation corresponds to the sign bit of the number or other value in the expanded representation. Accordingly, the high order bit (65) of the input register 80 provides an "S" sign signal that is provided to high order bit (63) of the output register 81 without modification. When the LD_OUT_REG_81 load output register 61 signal is asserted, the "S" signal from the input register 60 will be stored in the high order bit (63) of the output register 81 to provide the sign field of the delimited representation. It will be appreciated that the value stored in the high order bit (63) of output register 81 will correspond to the value stored in the high order bit (65) of the input register 80.

The bits (64) through (53) of the input register 80, which store the exponent field of the number or other value in the delimited representation, respectively provide E(11) and E(10):E(0) exponent signals in parallel to the gated driver 83. The E(11) exponent signal, if asserted, enables the gated driver 83 to couple the E(10):E(0) exponent signals as de(10):de(0) exponent signals to bits (62) through (52) of the output register 81. It will be appreciated that, if the E(11) exponent signal is asserted, the number or other value in input register 80 is either in category (i) above, that is, a number having the value positive or negative infinity, a value that would, in he IEEE Std. 754 representation be "NaN" (not a number), or a number that would, in the IEEE Std. 754 representation, be in the normalized format, or, from category (ii) above, a number that would, in the IEEE Std. 754 representation, be in the de-normalized format with the high order fraction bit of the fraction field having the value "one". In either case, the exponent field of the delimited representation corresponds to the bits $E_{10} \ldots E_0$ of the exponent field of the expanded representation, which essentially operates to subtract $2^{11}$ from the binary-encoded value represented by the exponent field of the expanded representation. Thus, when the LD_OUT_REG_81 load output register 61 signal is asserted, the de(10):de(0) signals from the gated driver 83 will be stored in the bits (62) through (52) of the output register 81 to provide the exponent field of the delimited representation. It will be appreciated that the values stored in the bits (62) through (52) of output register 81 will correspond to the values stored in the bits (62) through (52) of the input register 80.

On the other hand, if the E(11) signal is negated, the gated driver 83 will be de-energized, in which case the de(10):de(0) exponent signals will all be negated. It will be appreciated that, if the E(11) exponent signal is negated, the number or other value in input register 80 is a number in category (ii) above which has the value positive or negative zero or a value which would, in the IEEE Std. 754 representation, be in the denormalized format for which the high-order bit of the fraction field does not have the value "one". As described above, for such numbers, the bits of the exponent field all have the value "zero". Thus, when the LD_OUT_REG_81 load output register 61 signal is asserted, the negated de(10):de(0) signals from the gated driver 83 will be stored in the bits (62) through (52) of the output register 81 to provide the exponent field of the delimited representation. It will be appreciated that the values stored in the bits (62) through (52) of output register 81 will all correspond to the value zero.

The zero detector 82, decoders 84(i), AND gate 90 and OR gate 91 are all used to generate signals which are stored in bits (51) through (0) of the output register 81 to provide the fraction field of the number or other value in the delimited representation. The zero detector 82, AND gate 90 and OR gate 91 cooperate to generate a df(0) fraction signal that is stored in the output register 81 as the low-order bit (0) of the fraction field of the delimited representation. Each of the decoders 84(i) includes an OR gate 85(i) and an AND gate 86(i) that cooperate to generate a df(i) fraction signal that is stored in the output register 81 as the respective bit (i) of the fraction field of the delimited representation. The AND gates 86(i) in the respective decoders 84(i) are provided to identify, if a delimiter flag is to be provided, the particular bit of the delimited representation which is to be set to provide the delimiter flag. The OR gates 91 and 85(i) serve to couple the respective F(0) and F(i) fraction signals provided by the respective bits (i) of the fraction field of the number or other value stored in input register 80, or a signal representative of the delimiter flag, as the respective df(0) or df(i) signals to the output register 81. In any case, bit (52) of the input register 80, which corresponds to bit $F_{52}$ of the expanded representation, is not provided in the delimited representation, thereby to provide the implicit high-order "one" bit of the fraction portion of the respective number.

More specifically, if the number or other value stored in input register 80 is in category (i) above, that is, if it is a number having the value positive or negative infinity, a value that would, in the IEEE Std. 754 representation be "NaN" (not a number), or a number that would, in the IEEE Std. 754 representation, be in the normalized format, it would, in the delimited format correspond to the bits (51) through (0) of the fraction field of the expanded representation. It will be appreciated that the E(11) exponent signal, representing bit $E_{11}$ of the number or other value stored in input register 80 will be asserted, in which case, all of the AND gates 86(i) in the decoders 84(i) will be de-energized, thereby to negate respective SEL_DEL(i) select delimiter (i) signals provided to one input of the OR gates 85(i) of the respective decoders. In addition, at least one of the E(10):E(0) exponent signals representing the exponent bits $E_{10} \ldots E_0$ of the number or other value in the expanded representation will be asserted, in which case the zero detector 82 will negate a LOW_EXP_ALL_0'S low-order exponent all zero's signal. However, the OR gate 91 and 85(i) will receive respective F(0) and F(i) fraction signals, which are provided by bits (0) and (i) of the input register 80, and which correspond to bits $F_0$ and $F_i$ of the fraction field of the expanded representation, and provides it as respective df(0) and df(i) fraction signals to the respective bits (0) and (i) of output register 81. Thus, when the LD_OUT_REG_81 load output register 61 signal is asserted, the df(10):df(0) signals will be stored in the bits (51) through (0) of the output register 81 to provide the fraction field of the delimited representation. It will be appreciated that the values stored in the bits (51) through (0) of output register 81 will correspond to the values of the respective bits of the input register 80.

On the other hand, if the number or other value stored in input register 80 is a number in category (ii) above which has the value positive or negative zero or a value which would, in the IEEE Std. 754 representation, be in the denormalized format for which the high-order bit of the fraction field has the value "one," the E(11) exponent signal, representing bit $E_{11}$ of the number or other value stored in input register 80 will be asserted, in which case, all of the AND gates 86(i) in the decoders 84(i) will be de-energized, thereby to negate respective SEL_DEL(i) select delimiter (i) signals provided to one input of the OR gates 85(i) of the respective decoders. In addition, all of the E(10):E(0) exponent signals representing the exponent bits $E_{10} \ldots E_0$ of the number or other value in the expanded representation will be negated, in which case the zero detector 82 will assert a LOW_EXP_ALL_0'S low-order exponent all zero's signal. Since both the E(11) signal and the LOW_EXP_ALL_0'S signal are asserted, AND gate 90 will be energized, thereby to energize the OR gate 91, which, in turn, asserts the df(0) fraction signal. Since, as noted above, the SEL_DEL(i) select delimiter (i) signals generated by respective AND gates 86(i) are negated, the OR gates 85(i) of the respective decoders 84(i) will couple the respective F(i) signals to the output register 81 as the respective df(i) signals. Thus, when the LD_OUT_REG_81 load output register 61 signal is asserted, the df(10):df(0) signals will be stored in the bits (51) through (0) of the output register 81 to provide the fraction field of the delimited representation. It will be appreciated that the values stored in the bits (51) through (1) of output register 81 will correspond to the values of the respective bits (51) through (1) of the input register 80, and the bit (0) will be set to provide the delimiter flag.

Finally, if the number or other value stored in input register 80 is a number in category (ii) above which has the value positive or negative zero or a value which would, in the IEEE Std. 754 representation, be in the denormalized format for which the high-order bit of the fraction field does not have the value "one," E(11) exponent signal, representing bit $E_{11}$ of the number or other value stored in input register 80 will be negated, in which case the AND gate 90 will be de-energized. Since, for such numbers, the F(0) fraction signal will be negated, the OR gate 91 will provide a negated df(0) fraction signal to the output register 81.

The AND gates 86(i) receive, in addition to the negated E(11) exponent signal, the low-order E(5):E(0) exponent signals. Since the E(11) exponent signal is negated, one of the AND gates 86(i) will be energized, the one depending on the pattern of asserted and negated ones of the E(5):E(0) exponent signals, to assert the SEL_DEL(i) select delimiter (i) signal. The pattern of asserted and negated ones of the E(5):E(0) exponent signals is a function of the difference between the bias value for the exponent field for the expanded representation, $2^{11}$, and the binary-encoded value of the exponent field of the number in the expanded representation being converted and thus identifies the bit position of the fraction field of the delimited representation for the delimiter flag. It will be appreciated that the AND gates 86(j)(j≈i) will be de-energized, thereby to negate their SEL_DEL(j) select delimiter (j) signals, in which case the respective OR gates 85(j) will be enabled to couple the respective F(j) fraction signals to the output register 81 as the df(j) fraction signals. Thus, when the LD_OUT_REG_81 load output register 61 signal is asserted, the df(10):df(0) signals will be stored in the bits (51) through (0) of the output register 81 to provide the fraction field of the delimited representation.

Figure 6:
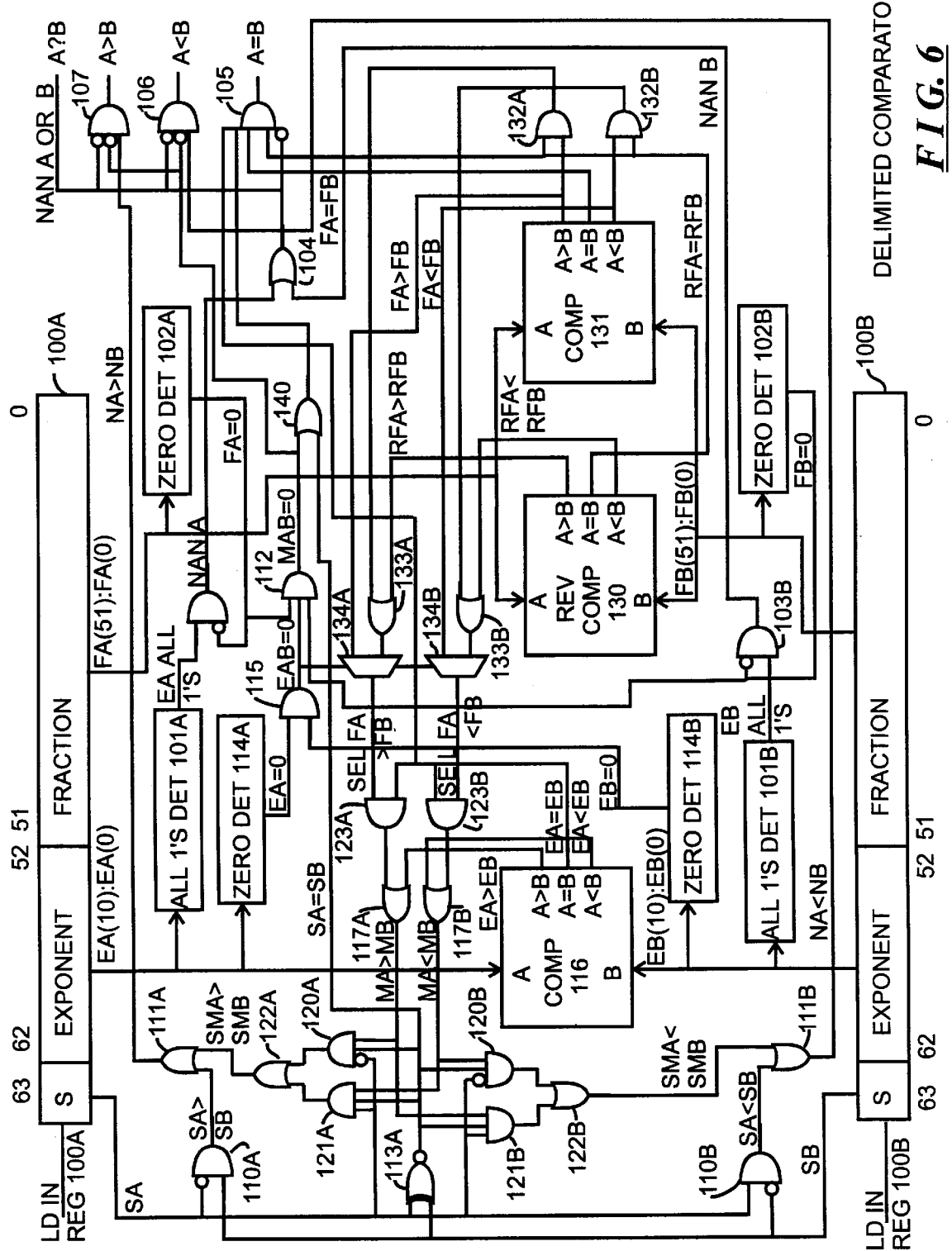
FIG. 6 is a functional block diagram of a circuit for comparing numbers and other values in the delimited representational format.

FIG. 6 is a functional block diagram of a comparator 34 for comparing numbers and other values in the delimited representational format. With reference to FIG. 6, the comparator includes input registers 100A and 100B (generally identified by reference numeral 100i) for receiving the numbers or other values to be compared, and logic, to be described below, for generating A>B A greater than, B, A<B A less than B, and A=B A equal to B signals, indicating that the number stored in input register 100A is, respectively, greater than, less than or equal to, the number stored in input register 100B, and an A?B indeterminate signal if the value stored in either input register 100A or 100B would, in the IEEE Std. 754 representation, be a "NaN" (not a number) value. The input registers 100A and 100B operate to receive and load respective sixty-four bit numbers or other values in the delimited representation that are to be compared in response to the assertion of respective LD_IN_REG_100A and $LD_{13}$ IN_REG_100B load input register 100A and 100B signals from the control circuit 23. The control circuit 23 may also provide control signals for controlling other components of the comparator 34 as necessary.

If either input register 100i is storing a "NaN" (not a number) value, it will be appreciated that all of the exponent bits $de_{10} \ldots de_0$ comprising its exponent field will have the value "one," and at least one bit $df_{51} \ldots df_0$ comprising its fraction will have the value "one." The comparator 34 includes two all one's detection circuits 101A and 101B (generally identified by reference numeral 101i) which receive respective EA(10):EA(0) exponent B signals, representative of the exponent bits of the value stored in input register 100A, and EB(10):EB(0) exponent B signals, representative of the exponent bits of the value stored in input register 100B. If an all one's detection circuit 101i determines that all of the respective exponent signals are asserted, which will be the case if all of the respective exponent bits have the value "one," it (that is, the all one's detection circuit 101a) will assert a respective EA_ALL_1'S exponent A all one's or EB_ALL_1'S exponent B all one's signal. The asserted EA_ALL_1'S signal energizes one input of AND gate 103A, and the asserted EB_ALL_1'S signal energizes one input of AND gate 103B.

The comparator 34 further includes two zero detectors 102A and 102B (generally identified by reference numeral 102i) which receive respective FA(51):FA(0) fraction A signals, representative of the $df_{51} \ldots df_0$ fraction bits of the value stored in input register 100A, and FB(51):FB(0) fraction B signals, representative of the $df_{51} \ldots df_0$ fraction bits of the value stored in input register 101B. If at least one fraction bit $df_j$ in an input register 100i has the value "one," the zero detector 102i will negate a respective FA=0 fraction A equals zero signal or FB=0 fraction B equals zero signal. In that case, the second input of the respective AND gate 103i will also be energized, thereby to enable it (that is, the AND gate 103i) to assert a respective NAN A not a number A or NAN B not a number B signal. If either NAN A or NAN B signal is asserted, an OR gate 104 will be energized to assert a NAN A OR B not a number A or B signal, which is provided as the A?B indeterminate output signal. In addition, the NAN A OR B signal is provided to disable the AND gates 105 through 107, thereby to negate the respective A=B A equals B, A<B A less than B and A>B A greater than B signals provided thereby. Thus, if the value stored in either input register 100A or 100B is a NaN (not a number) value, the A?B indeterminate signal will be asserted, and the other signals A>B, A<B and A=B will be negated.

If an all one's detection circuit 101i is negating the respective EA_ALL_1'S or EB_ALL_1'S signal, which will be the case if the respective EA(11):EA(0) exponent A signals or EB(11):EB(0) signals do not all have the value "one," the respective AND gate 103i will be de-energized thereby to negate the respective NAN A or NAN B signal. In that case, the number or other value stored in the respective input register 100i may be either positive or negative zero, or a number that would, in the IEEE Std. 754 representation, be in either the normalized or de-normalized format. Similarly, if a zero detector 102i is asserting the respective FA=0 or FB=0 signal, which will be the case if the respective FA(51):FA(0) fraction A signals or FB(51):FB(0) fraction B signals are all zero, the respective AND gate 103i) will be de-energized thereby to negate the respective NAN A or NAN B signal. In that case, the number or other value stored in the respective input register 100i may be either positive or negative infinity, positive or negative zero, or a number that would, in the IEEE Std. 754 representation, be in the normalized format. Thus, if both AND gates 103A and 103B are de-energized, which will be the case if both input registers 100i are storing numbers or other values which are either positive or negative infinity, positive or negative zero, or a number that would, in the IEEE Std. 754 representation, be in either the normalized or de-normalized format, the OR gate 104 will also be de-energized, thereby negating the NAN A OR B signal, which, in turn, negates the A?B indeterminate signal. In addition, the negated NAN A OR B signal serves to energize one input each of AND gates 105 through 107.

If both input registers 100A and 100B are storing numbers, that are either positive or negative infinity, positive or negative zero, or a number that would, in the IEEE Std. 754 representation, be in either the normalized or de-normalized format, the remaining components depicted on FIG. 6 serve to compare the values of the respective numbers and assert one of the A>B, A<B or A=B signals. Generally, the components compare the contents of the respective sign bit and the exponent and fraction fields. Thus, if the sign bit, comprising bit (63), of the number stored in input register 100A, has the value "zero," indicating that the number is positive, an SA sign A signal will be negated, thereby to energize one input of an AND gate 110A. On the other hand, if the sign bit, also comprising bit (63), of the number stored in input register 100B, has the value "one," indicating that the number is negative, the second input of AND gate 110A will also be energized, thereby to enable the AND gate 110A to assert an SA>SB sign A greater than sign B signal. An OR gate 111A will couple the asserted SA>SB signal to the AND gate 107 as a NA>NB number A greater than number B signal. In that case, if an AND gate 112 is not asserting an MAB=0 magnitude of A and B equals zero signal, which, as will be described below, will be the case if input registers 100i are not both storing numbers having the value of positive or negative zero, the AND gate 107 will assert the A>B A greater than B signal. Similarly, if the sign bit of the number stored in input register 100A has the value "one," indicating that the number is negative, and if the sign bit of the number stored in input register 100B has the value "zero," indicating that the number is positive, an AND gate 110B will be energized to assert an SA<SB sign A less than sign B signal, which is coupled to the AND gate 106 as a NA<NB number A less than number B signal. If the AND gate 112 is not asserting the MAB=0 signal, the AND gate 106 will assert the A<B a less than B signal. Thus, unless the numbers stored in the input registers 100A and 100B both have the value zero, if the signs differ the comparator 34 will determine which number has the larger value based on the values of the respective sign bits. If the values of the sign bits of the numbers in input registers 100A and 100B are the same, it will be appreciated that both AND gates 110A and 110B will be de-energized, thereby negating the SA>SB and SA<SB signals.

The comparator 34 includes zero detectors 114A and 114B (generally identified by reference numeral 114i) for receiving respective EA(10):EA(0) exponent A and EB(10):EB(0) exponent B signals that are representative of the respective $E_{11} \ldots E_0$ exponent bits of the numbers stored in the respective input registers 110A and 110B. If a zero detector 114i determines that all of the respective EA(10):EA(0) or EB(10):EB(0) exponent signals are negated, which will be the case if all of the exponent bits of the number stored in the respective input register 100i have the value "zero," it (that is, the zero detector 114i) will assert a respective EA=0 or EB=0 signal. It will be appreciated that, if a zero detector 114i determines that all of the respective EA(10):EA(0) or EB(10):EB(0) exponent signals from an input register 100i are negated, the number stored in that input register 100i has a value of either positive or negative zero or a number that would, in the IEEE Std. 754 representation, be in the de-normalized format. On the other hand, if a zero detector 114i determines that not all of the respective EA(10):EA(0) or EB(10):EB(0) exponent signals from an input register 100i are negated, the number or other value stored in that input register 100i is either positive or negative infinity, or is a number that would, in the IEEE Std. 754 representation, be in the normalized format, or is a "NaN" (not a number) value.

If both zero detectors 114A and 114B are asserting respective EA=0 and EB=0 signals, an AND gate 115 will be energized to assert an EAB=0 exponent A and B equals zero signal, indicating that all of the exponent bits of the numbers stored in both input registers 100A and 100B have the value "zero." If, in addition, both zero detectors 102A and 102B are asserting respective FA=0 and FB=0 fraction A equals zero and fraction B equals zero signals, AND gate 112 will be energized to assert the MAB=0 magnitude A and B equals zero signal, which is provided to the AND gates 106 and 107 as described above. It will be appreciated that the AND gate 112 will assert the MAB=−0 signal if the both input registers 100A and 100B are storing numbers having the value positive or negative zero.

In addition, a comparator 116 receives the EA(10):EA(0) or EB(10):EB(0) exponent signals from the input registers 110A and 110B and generates output signals EA>EB exponent A greater then exponent B, EA=EB exponent A equals exponent B and EA<EB exponent A less than exponent B reflecting the relative binary-encoded values represented by the respective exponent signals. Thus, if the binary-encoded value represented by the EA(10):EA(0) exponent signals is greater than the binary encoded value represented by the EB(10):EB(0) exponent signals, the comparator 116 will assert the EA>EB signal, if the binary-encoded value represented by the EA(10):EA(0) exponent signals equals the binary encoded value represented by the EB(10):EB(0) exponent signals, the comparator 116 will assert the EA=EB signal, and if the binary-encoded value represented by the EA(10):EA(0) exponent signals is less than the binary encoded value represented by the EB(10):EB(0) exponent signals, the comparator 116 will assert the EA<EB signal. It will be appreciated that the one of the EA>EB, EA=EB and EA<EB signal that is asserted will indicate the relative magnitudes of the exponents of the numbers stored in input registers 100A and 100B. The EA>EB and EA<EB signals generated by the comparator 116 are provided to respective OR gates 117A and 117B so that, if the EA>EB signal is asserted, OR gate 117A will assert an MA>MB magnitude A greater than magnitude B signal, but, if the EA<EB signal is asserted, OR gate 117B will assert an MA<MB magnitude A less than magnitude B signal. In either case, since the EA=EB exponent A equals exponent B signal is negated, AND gates 123A and 123B will negate respective GTD FA>FB gated fraction A greater than fraction B and GTD FA<FB gated fraction A less than fraction B signals.

It will be appreciated that the one of the MA>MB signal or the MA<MB signal which is asserted will indicate which, if either, number in input register 100A or 100B is larger in absolute value, that is, ignoring the sign of the respective number. If the signs of the numbers differ, the appropriate signals are generated as described above. However, if the values of the sign bits of the numbers in input registers 100A and 100B are the same, an XNOR gate 113 will assert an SA=SB sign A equals sign B signal, energizing respective inputs of four AND gates 120A, 120B, 121A and 121B. In addition, it will be appreciated that both AND gates 110A and 110B will be de-energized, thereby negating the SA>SB and SA<SB signals. If the values of the sign bits indicates that the values in input registers 100A and 100B are both positive, the SA sign A signal will be negated, thereby energizing respective second inputs of AND gates 120A and 120B. If the MA>MB magnitude A greater than magnitude B signal is asserted, AND gate 120A will be energized, which, in turn, energizes an OR gate 122A to assert an SMA>SMB sign/magnitude A greater than sign/magnitude B signal. The asserted SMA>SMB signal, in turn, energizes OR gate 111A to assert the NA>NB signal, which is provided to AND gate 107. It will be appreciated that both the NAN A OR B not a number A or B signal and the MAB=0 magnitude A and B signals will be negated, in which case the AND gate 107 will be energized to assert the A>B A greater than B signal. On the other hand, since the SA and MA<MB signals are both negated, AND gates 120B and 121B will be de-energized, thereby to negate a SMA<SMB sign/magnitude A less than sign/magnitude B signal. Since the SA<SB signal is also negated, OR gate 111B will negate the NA<NB number A less than number B signal, thereby to de-energize AND gate 106 and negate the A<B A less than B signal. Since the EA=EB exponent A equals exponent B signal is negated, the AND gate 105 will also be de-energized to negate the A=B A equals B signal.

Similarly, if the values of the sign bits indicates that the values in input registers 100A and 100B are both positive, but if the MA<MB magnitude A less than magnitude B signal is asserted, AND gate 120B will be energized, which, in turn, energizes an OR gate 122B to assert an SMA<SMB sign/magnitude A less than sign/magnitude B signal. The asserted SMA<SMB signal, in turn, energizes OR gate 111A to assert the NA>NB signal, which is provided to AND gate 106. It will be appreciated that both the NAN A OR B not a number A or B signal and the MAB=0 magnitude A and B signals will be negated, in which case the AND gate 106 will be energized to assert the A<B A less than B signal. On the other hand, since the SA and MA>MB signals are both negated, AND gates 120A and 121A will be de-energize gated, thereby to negate the SMA>SMB sign/magnitude A greater than sign/magnitude B signal. Since the SA>SB signal is also negated, OR gate 111A will negate the NA>NB number A greater than number B signal, thereby to de-energize AND gate 107 and negate the A>B A greater than B signal. Since the EA=EB exponent A equals exponent B signal is negated, and AND gate 105 will also be de-energized to negate the A=B A equals B signal.

On the other hand, if the values of the sign bits indicates that the values in input registers 100A and 100B are both negative, it will be appreciated that the value with the smaller magnitude will have the larger value. In that case, the SA sign A signal will be asserted thereby energizing respective second inputs of AND gates 121A and 121B. If the MA<MB magnitude A less than magnitude B signal is asserted, AND gate 121A will be energized, which, in turn, energizes an OR gate 122A to assert an SMA>SMB sign/magnitude A greater than sign/magnitude B signal. The asserted SMA>SMB signal, in turn, energizes OR gate 111A to assert the NA>NB signal, which is provided to AND gate 107. It will be appreciated that both the NAN A or B not a number A or B signal and the MAB=0 magnitude A and B signal will be negated, in which case the AND gate 107 will be energized to assert the A>B A greater than B signal. On the other hand, since the SA signal is asserted and the MA>MB signals is negated, AND gates 120B and 121B will be de-energized, thereby to negate a SMA<SMB sign/magnitude A less than sign/magnitude B signal. Since the SA<SB signal is also negated, OR gate 111B will negate the NA<NB number A less than number B signal, thereby to de-energize AND gate 106 and negate the A<B A less than B signal. Since the EA=EB exponent A equals exponent B signal is negated, the AND gate 105 will also be de-energized to negate the A=B A equals B signal.

Similarly, if the values of the sign bits indicates that the values in input registers 100A and 100B are both negative, but if the MA>MB magnitude A greater than magnitude B signal is asserted, AND gate 121B will be energized, which, in turn, energizes an OR gate 122B to assert the SMA<SMB sign/magnitude A less than sign/magnitude B signal. The asserted SMA<SMB signal, in turn, energizes OR gate 111A to assert the NA>NB signal, which is provided to AND gate 106. It will be appreciated that both the NAN A OR B not a number A or B signal and the MAB=0 magnitude A and B signals will be negated, in which case the AND gate 106 will be energized to assert the A<B A less than B signal. On the other hand, since the SA signal is asserted and the MA>MB signal is negated, AND gates 120A and 121A will be de-energize gated, thereby to negate the SMA>SMB sign/magnitude A greater than sign/magnitude B signal. Since the SA>SB signal is also negated, OR gate 111A will negate the NA>NB number A greater than number B signal, thereby to de-energize AND gate 107 and negate the A>B A greater than B signal. Since the EA=EB exponent A equals exponent B signal is negated, and AND gate 105 will also be de-energized to negate the A=B A equals B signal.

It will be appreciated that, if the SA sign A signal and the SB sign B signal are not both either asserted or negated, the XNOR gate 113 will negate the SA=SB sign A equals sign B signal, in which case all of the AND gates 120A, 120B, 121A and 121B will be de-energized, thereby to negate both the SMA>SMB signal and the SMA<SMB signal.

If the values of the exponent fields of the numbers in input registers 100A and 100B are equal, the EA>EB and EA<EB energizes will be negated and the EA=EB exponent A equals exponent B signal will be asserted. In that case, the determination as to which number has the larger absolute value be made by other circuitry depicted on FIG. 6, in particular, by comparators 130 and 131, AND gates 132A and 132B, OR gates 133A and 133B, multiplexers 134A and 134B and AND gates 123A and 123B. Comparator 131 receives the FA(51):FA(0) and FB(51):FB(0) fraction signals from the respective input registers 100A and 100B and asserts the FA>FB fraction A greater than fraction B, FA=FB fraction A equals fraction B, or FA<FB fraction A less than fraction B signal, reflecting the relative magnitude of the binary encoded value represented by the FA(51):FA(0) and FB(51):FB(0) fraction signals. If the EAB=0 exponent A and B equal zero signal is negated, multiplexers 134A and 134B will couple the FA>FB and FA<FB energizes as respective SEL_FA>FB selected fraction A greater than fraction B and SEL_FA<FB selected fraction A less than fraction B signals to respective AND gates 123A and 123B. As noted above, the EAB'0 signal will be negated if the both zero detectors 114A and 114B are negating respective EA=0 exponent A equals zero and EB=0 exponent B equals zero signals, which, in turn, will be the case if the input registers 100A and 100B are storing numbers having the value positive or negative infinity, a value that would, in the IEEE Std. 754 representation be "NaN" (not a number), or a number that would, in the IEEE Std. 754 representation, be in the normalized format. Since the EA=EB exponent A equals exponent B signal, the AND gates 123A and 123B will couple the SEL_FA>FB and SEL_FA<FB signals to the OR gates 117A and 117B as respective GTD FA>FB and GTD FA<FB signals.

Thus, if the input registers 100A and 100B are storing numbers having the value positive or negative infinity, a value that would, in the IEEE Std. 754 representation be "NaN" (not a number), or a number that would, in the IEEE Std. 754 representation, be in the normalized format, and if the binary-encoded value represented by the FA(51):FA(0) fraction signals is larger than the binary-encoded value represented by the FB(51):FB(0) fraction signals, the comparator 131 will assert the FA>FB signal, which, in turn, is coupled by multiplexer 134A to AND gate 123A. Since the EA=EB exponent A equals exponent B signal is asserted, AND gate 123A asserts the GTD FA>FB gated fraction A greater than fraction B signal to OR gate 117A, which, in turn, is energized to assert the MA>MB magnitude A greater than magnitude B signal. In addition, comparator 131 will generate a negated FA=FB fraction A equals fraction B signal, which causes AND gate 105 to be de-energized to negate the A=B signal, and a negated FA<FB fraction A less than fraction B signal, which is coupled by multiplexer 134B to AND gate 123B. Since the EA=EB exponent A equals exponent B signal is asserted, AND gate 123B negates the GTD FA<FB gated fraction A less than fraction B signal to OR gate 117B, Since the EA<EB exponent A less than exponent B signal is also negated, OR gate 117B is de-energized to negate the MA<MB magnitude A greater than magnitude B signal thereby to de-energize AND gates 120B and 121A. In that condition, one of the AND gates 120A or 121B will be energized, depending on the condition of the SA sign A signal, to assert a respective one of the SMA>SMB sign/magnitude A greater than sign/magnitude B or the SMA<SMB sign/magnitude A less than sign/magnitude B signal to, in turn, energize one of AND gate 107 or 106 to assert the A>B or A<B signal, as described above.

On the other hand, if the binary-encoded value represented by the FA(51):FA(0) fraction signals is smaller than the binary encoded value represented by the FB(51):FB(0) fraction signals, the comparator 131 will assert the FA<FB fraction A less than fraction B signal, which, in turn, is coupled by multiplexer 134B to AND gate 123B. Since the EA=EB exponent A equals exponent B signal is asserted, AND gate 123B asserts the GTD FA<FB gated fraction A less than fraction B signal to OR gate 117B, which, in turn, is energized to assert the MA<MB magnitude A less than magnitude B signal. In addition, comparator 131 will generate a negated FA=FB fraction A equals fraction B signal, which causes AND gate 105 to be de-energized to negate the A=B signal, and a negated FA>FB fraction A greater than fraction B signal, which is coupled by multiplexer 134A to AND gate 123A. Since the EA=EB exponent A equals exponent B signal is asserted, AND gate 123A negates the GTD FA>FB gated fraction A greater than fraction B signal to OR gate 117A, Since the EA>EB exponent A less than exponent B signal is also negated, OR gate 117A is de-energized to negate the MA>MB magnitude A greater than magnitude B signal thereby to de-energize AND gates 120A and 120B. In that condition, one of the AND gates 121A or 121B will be energized, depending on the condition of the SA sign A signal, to assert a respective one of the SMA>SMB sign/magnitude A greater than sign/magnitude B or the SMA<SMB sign/magnitude A less than sign/magnitude B signal, to, in turn, energize one of AND gate 107 or 106 to assert the A>B or A<B signal, as described above.

The comparator 130 also receives the FA(51):FA(0) fraction A and FB(51):FB(0) fraction B signals. Generally, the comparator 130 identifies in which set of fraction signals the "rightmost" signal is asserted. That is, if, in the FA(51):FA(0) fraction A signals, the $FA(i_A)$ signal is asserted and $FA(i_A-1)$, . . . , FA(0) fraction A signals are negated, and in the FB(51):FB(0) fraction B signals, the $FB(i_B)$ signal is asserted and $FB(i_B-1)$, . . . , FB(0) fraction B signals are negated, the comparator 130 will generate an asserted RFA>RFB right fraction A greater than right fraction B signal if $i_A$ is less than $i_B$, an asserted RFA=RFB right fraction A equals right fraction B signal if $i_A$ equals $i_B$, and an asserted RFA<RFB right fraction A less than right fraction B if $i_A$ is greater than $i_B$. It will be appreciated that if the input registers are both storing numbers which would, in the IEEE Std. 754 representation, be in the de-normalized format, the comparator 130 will essentially be comparing the fraction signals for the positions of the delimiter flags of the respective numbers in the input registers 100A and 100B. Thus, if the RFA>RFB signal is asserted, the delimiter flag of the number stored in input register 100A is in a lower bit position than the delimiter flag of the number stored in input register 100B, if the RFA=RFB signal is asserted, the delimiter flags of the numbers are in the same bit position, and if the RFA<RFB signal is asserted, the delimiter flag of the number stored in input register 100A is in a higher bit position than the delimiter flag of the number stored in input register 100B. It will be appreciated that, if the RFA>RFB signal is asserted, the number stored in input register 100A will be greater than the number stored in input register 100B, if the RFA<RFB signal is asserted, the number stored in input register 100A is less than the number stored in input register 100B, and if the RFA=RFB signal is asserted, the relative magnitudes of the numbers will be determined by the other bits of the fraction fields of the two numbers.

Accordingly, if the input registers 100A and 100B are both storing numbers which would, in the IEEE Std. 754 representation, be in the de-normalized format, the exponent bits $e_{10} \ldots e_0$ of both numbers will all be "zero," and so both zero detectors 114A and 114B will assert respective EA=0 exponent A equals zero and EB=0 exponent B equals zero signals. In that case, AND gate 115 asserts the EAB=0 exponent A and B equals zero signal, which enables the multiplexers 134A and 134B to couple signals from OR gates 133A and 133B to the respective AND gates 123A and 123B. If the RFA>RFB signal is asserted, OR gate 133A will be energized to assert an output signal that is coupled by the multiplexer 134A as the asserted SEL FA>FB selected fraction A greater than fraction B signal to the AND gate 123A. On the other hand, since the RFA=RFB signal is negated, AND gates 132A and 132B will be de-energized, thereby to negate R_EQ_&FA>FB rightmost bits equal and fraction A greater than fraction B and R_EQ_&FA<FB rightmost bits equal and fraction A less than fraction B signals, and further since the RFA<RFB signal is negated, OR gate 133B will be de-energized to negated an output signal that is coupled by multiplexer 134B as the negated SEL FA<FB selected fraction A less than fraction B signal to the AND gate 123B. Since the EA=EB exponent A equals exponent B signal is asserted, AND gate 123B negates the GTD FA<FB gated fraction A less than fraction B signal to OR gate 117B, Since the EA<EB exponent A less than exponent B signal is also negated, OR gate 117B is de-energized to negate the MA<MB magnitude A less than magnitude B signal thereby to de-energize AND gates 120B and 121A. In that condition, one of the AND gates 120A or 121B will be energized, depending on the condition of the SA sign A signal, to assert a respective one of the SMA>SMB sign/magnitude A greater than sign/magnitude B or the SMA<SMB sign/magnitude A less than sign/magnitude B signal to, in turn, energize one of AND gate 107 or 106 to assert the A>B or A<B signal, as described above. Since the RFA=RBF signal is negated, AND gate 105 will be de-energized, thereby to negate the A=B A equals B signal.

On the other hand, of the RFA<RFB signal is asserted, OR gate 133B will be energized to assert an output signal that is coupled by the multiplexer 134B as the asserted SEL FA<FB selected fraction A less than fraction B signal to the AND gate 123B. On the other hand, since the RFA=RFB signal is negated, AND gates 132A and 132B will be de-energized, thereby to negate R_EQ_&FA>FB rightmost bits equal and fraction A greater than fraction B and R_EQ_&FA<FB rightmost bits equal and fraction A less than fraction B signals, and further since the RFA>RFB signal is negated, OR gate 133A will be de-energized to negated an output signal that is coupled by multiplexer 134A as the negated SEL FA>FB selected fraction A greater than fraction B signal to the AND gate 124A. Since the EA=EB exponent A equals exponent B signal is asserted, AND gate 123A negates the GTD FA>FB gated fraction A greater than fraction B signal to OR gate 117A, Since the EA>EB exponent A greater than exponent B signal is also negated, OR gate 117A is de-energized to negate the MA>MB magnitude A greater than magnitude B signal thereby to de-energize AND gates 120A and 121B. In that condition, one of the AND gates 120B to 121A will be energized, depending on the condition of the SA sign A signal, to assert a respective one of the SMA>SMB sign/magnitude A greater than sign/magnitude B or the SMA<SMB sign/magnitude A less than sign/magnitude B signal to, in turn, energize one of AND gate 107 or 106 to assert the A>B or A<B signal, as described above. Since the RFA=RFB signal is negated, AND gate 105 will be de-energized, thereby to negate the A=B A equals B signal.

If, on the other hand, the RFA=RFB signal is asserted, which will be the case if the delimiter flags of the numbers stored in the input registers 100A and 100B are in the same bit positions, both the RFA>RFB signal and the RFA<RFB signal will be negated. In that condition, the comparison is made based on the other bits of the fraction fields of the numbers. In particular, if the RFA=RFB signal is asserted, one input each of AND gates 132A and 132B will be energized. If the comparator 131 determines that the binary-encoded value represented by the FA(51):FA(0) fraction A signals is greater than the binary-encoded value represented by the FB(51):FB(0) fraction A signals, it will assert the FA>FB signal, thereby to enable AND gate 132A to assert the R_EQ_&FA>FB rightmost bits equal and fraction A greater than fraction B signal, which is coupled to a second input of OR gate 133A. On the other hand, since the R_EQ_&FA<FB rightmost bits equal and fraction A less than fraction B signals, and further since the RFA<RFB signal is negated, OR gate 133B will be de-energized to negate an output signal that is coupled by multiplexer 134B as the negated SEL FA<FB selected fraction A less than fraction B signal to the AND gate 124B. Since the EA=EB exponent A equals exponent B signal is asserted, AND gate 123B negates the GTD FA<FB gated fraction A less than fraction B signal to OR gate 117B, and further since the EA<EB exponent A less than exponent B signal is also negated, OR gate 117B is de-energized to negate the MA<MB magnitude A less than magnitude B signal thereby to de-energize AND gates 120B and 121A. In that condition, one of the AND gates 120A or 121B will be energized, depending on the condition of the SA sign A signal, to assert a respective one of the SMA>SMB sign/magnitude A greater than sign/magnitude B or the SMA<SMB sign/magnitude A less than sign/magnitude B signal to, in turn, energize one of AND gate 107 or 106 to asset the A>B or A<B signal, as described above. Since the RFA=RFB signal is negated, AND gate 105 will be de-energized, thereby to negate the A=B A equals B signal.

IF the RFA=RFB signal is asserted, but if the comparator 131 determines that the binary-encoded value represented by the FA(51):FA(0) fraction A signals is less than the binary-encoded value represented by the FB(51):FB(0) fraction A signals, it will assert the FA<FB signal, thereby to enable AND gate 132B to assert the R_EQ_&FA<FB rightmost bits equal and fraction A less than fraction B signal, which is coupled to a second input of OR gate 133B. On the other hand, since the R_EQ_&FA>FB rightmost bits equal and fraction A greater than fraction B signals, and further since the RFA>RFB signal is negated, OR gate 133A will be de-energized to negate an output signal that is coupled by multiplexer 134A as the negated SEL FA>FB selected fraction A greater than fraction B signal to the AND gate 124A. Since the EA=EB exponent A equals exponent B signal is asserted, AND gate 123A negates the GTD FA>FB gated fraction A greater than fraction B signal to OR gate 117A, and further since the EA>EB exponent A less than exponent B signal is also negated, OR gate 117A is de-energized to negate the MA>MB magnitude A greater than magnitude B signal, thereby to de-energize AND gates 120A and 121B. In that condition, one of the AND gates 120B or 121A will be energized, depending on the condition of the SA sign A signal, to assert a respective one of the SMA>SMB sign/magnitude A greater than sign/magnitude B or the SMA<SMB sign/magnitude A less than sign/magnitude B signal to, in turn, energize one of AND gate 107 or 106 to assert the A>B or A<B signal, as described above. Since the RFA=RFB signal is negated, AND gate 105 will be de-energized, thereby to negate the A=B A equals B signal.

It will be appreciated that, if the numbers in the input registers 100A and 100B have the same value, both the MA>MB magnitude A greater than magnitude B and the MA<MB magnitude A less than magnitude B signal will be negated, thereby to enable the OR gates 111A and 111B to negate the NA>NB number A greater than number B and NA<NB number A less than number B signals. In that condition, both AND gates 106 and 107 will be de-energized, thereby to negate the A>B A greater than B and A<B A less than B signals. If the numbers in the input registers 100A and 100B have the same value, then the comparator 116 will assert the EA=EB exponent A equals exponent B signal, comparator 130 will assert the RFA=RFB rightmost fraction A equals rightmost fraction B signal, and comparator 131 will assert the FA=FB fraction A equals fraction B signal, which energize respective inputs of AND gate 105. It will be appreciated that, if the EA=EB, RFA=RFB and FA=FB signals are all asserted, the absolute value of the numbers stored in the input registers 100A and 100B will be the same. If, in addition, the XNOR gate 113 signal is asserting the SA=SB sign A equals sign B signal, an OR gate 140 will assert an S_EQ_OR_MAG_0 signs equal or magnitudes zero signal, which energizes the last input of AND gate 105, thereby enabling the AND gate 105 to assert the A=B A equals B signal. In addition, if the EAB=0 exponent A and B equals zero signal is asserted, and if both zero detectors 102A and 102B are asserting respective FA=0 fraction A equals zero and FB=0 fraction B equals zero signals, which will be the case if all of the fraction bits $df_{51} \ldots df_0$ in both input registers 100A and 100B have the value "zero," the AND gate 112 will assert the MAB=0 magnitude A and B equals zero signal. It will be appreciated that the MAB=0 signal will be asserted if both input registers 100A and 100B are storing numbers having the value positive or negative zero. If the MAB=0 signal is asserted, OR gate 140 will also assert the S_EQ_OR_MAG_0 signs equal or magnitudes zero signal, which energizes the last input of AND gate 105, thereby enabling the AND gate 105 to assert the A=B A equals B signal. Thus, the AND gate 105 will assert the A=B signal if the numbers in input registers 100A and 100B have the same signs and absolute values, or, if the signs differ, if the absolute values of the numbers both have the value zero.

As noted above, the illustrative embodiments has been described in connection with the sixty-four bit IEEE Std. 754 "double" format and the corresponding sixty-six bit expanded representation. Extensions to the thirty-two bit IEEE Std. 754 "single" format and a corresponding thirty-four bit expanded representation will be apparent to those skilled in the art.

The invention provides a number of advantages. For example, the invention provides a delimited representation for numbers and other values for which the fraction field is in substantially the same normalized format, in contrast to the IEEE Std. 754 representation. In addition, the numbers and other values in the delimited format can be converted to and from the common expanded representation without requiring shifting, reference the respective converters in FIGS. 4 and 5, which can provide for faster processing.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention, It will be apparent, however, that various and modifications may be made to the invention, with the attainment of some or all of the advantages of the invention. It is the object of the appended claims to cover these and other variations and modifications as come within the true spirit and scope of the invention.

What is claimed as new and desired to be secured by Letters Patent of the United States is:

1. A comparator for comparing values of numbers in a delimited floating point representation, each number comprising at least a fraction field, the delimited floating point representation providing for numbers of at least one value to have a delimiter flag identifying a least significant bit position of the respective fraction field, the comparator comprising:

A. a fraction comparator configured to receive the fraction fields of the respective numbers to be compared and to generate a relative fraction value indication in response thereto;

B. a delimiter flag comparator configured to determine the positions of delimiter flags of the respective numbers and to generate a relative delimiter flag position indication in response thereto; and C. a comparison resolver configured to generate a comparison value indicative of the relative values of the respective numbers in response to the relative fraction value indication and the relative delimiter flag position indication.

2. A comparator as defined in claim 1 in which each number further comprises an exponent field, the comparator further including an exponent comparator configured to receive the exponent fields of the respective numbers and to generate a relative exponent value indication in response thereto, the comparison resolver further generating the comparison value in response to the relative exponent value indication.

3. A comparator as defined in claim 2 in which each number further comprises a sign field, the comparator further including a sign comparator configured to receive the exponent fields of the respective numbers and to generate a relative sign value indication in response thereto, the comparison resolver further generating the comparison value response to the relative sign value indication.

4. A comparator method for comparing values of numbers in a delimited floating point representation, each number comprising at least a fraction field, the delimited floating point representation providing for numbers of at least one value to have a delimiter flag identifying a least significant bit position of the respective fraction field, the comparator comprising:

A. a fraction comparison step in which the fraction fields of the respective numbers are compared and a relative fraction value indication generated in response thereto;

B. a delimiter flag comparison step in which the relative positions of delimiter flags of the respective numbers are determined and a relative delimiter flag position indication generated in response thereto; and C. a comparison resolution step in which a comparison value indicative of the relative values of the respective numbers is generated in response to the relative fraction value indication and the relative delimiter flag position indication.

5. A comparator as defined in claim 4 in which each number further comprises an exponent field, the method further including an exponent comparator step for generating a relative exponent value indication in response to the exponent fields of the respective numbers, the comparison resolution step further generating the comparison value in response to the relative exponent value indication.

6. A comparator method as defined in claim 5 in which each number further comprises a sign field, the method further including a sign comparison step for generating a relative exponent value indication in response to the sign fields of the respective numbers, the comparison resolution step further generating the comparison value in response to the relative exponent value indication.

\* \* \* \* \*